US012371878B2

(12) United States Patent
Sadilek et al.

(10) Patent No.: US 12,371,878 B2
(45) Date of Patent: Jul. 29, 2025

(54) AUTONOMOUS CONTROL OF OPERATIONS OF EARTH-MOVING VEHICLES USING TRAINED MACHINE LEARNING MODELS

(71) Applicant: AIM Intelligent Machines, Inc., Monroe, WA (US)

(72) Inventors: Adam Sadilek, Monroe, WA (US); Ahmet Haluk Açarçiçek, Feyzullah (TR)

(73) Assignee: AIM Intelligent Machines, Inc., Monroe, WA (US)

( * ) Notice: Subject to any disclaimer, the term of this patent is extended or adjusted under 35 U.S.C. 154(b) by 364 days.

(21) Appl. No.: 18/107,892

(22) Filed: Feb. 9, 2023

(65) Prior Publication Data
US 2024/0093464 A1      Mar. 21, 2024

Related U.S. Application Data

(60) Provisional application No. 63/328,469, filed on Apr. 7, 2022.

(51) Int. Cl.
*E02F 9/20* (2006.01)
*G05B 13/02* (2006.01)

(52) U.S. Cl.
CPC ............ *E02F 9/205* (2013.01); *G05B 13/027* (2013.01)

(58) Field of Classification Search
None
See application file for complete search history.

(56) References Cited

U.S. PATENT DOCUMENTS 9,630,321 B2    4/2017  Bradski et al.
11,375,041 B2   6/2022  Theverapperuma et al.
(Continued)

FOREIGN PATENT DOCUMENTS

CN    111942200 A    11/2020
CN    115205395 A    10/2022
(Continued)

OTHER PUBLICATIONS

Grove—12 Bit Magnetic Rotary Position Sensor (AS5600), retrieved on Aug. 22, 2022 from wiki.seeedstudio.com/Grove-12-bit-Magnetic-Rotary-Position-Sensor-AS5600/, 13 pages.
(Continued)

*Primary Examiner* — Adam D Tissot
(74) *Attorney, Agent, or Firm* — VLP Law Group LLP; James A. D. White

(57) ABSTRACT

Systems and techniques are described for implementing autonomous control of earth-moving vehicles, including to automatically determine and control movement around a site having potential obstacles. For example, the systems/techniques may determine and implement autonomous operations of excavator vehicle(s) (e.g., obtain/integrate data from sensors of multiple types, and use it to determine and control movement of the excavator vehicle around a site), including in some situations to implement coordinated actions of multiple excavator vehicles and/or of an excavator vehicle with one or more other types of earth-moving vehicles. The described techniques may further include determining current location and positioning of the excavator vehicle on the site, determining a target destination location and/or route of the excavator vehicle, identifying and classifying obstacles (if any) along a desired route or otherwise between current and destination locations, and implementing actions to address any such obstacles.

20 Claims, 20 Drawing Sheets

(56) References Cited

U.S. PATENT DOCUMENTS

| | | | |
|---|---|---|---|
| 11,494,930 | B2* | 11/2022 | Theverapperuma ..... B25J 9/163 |
| 11,560,690 | B2 | 1/2023 | Halder et al. |
| 11,567,197 | B2* | 1/2023 | Halder .................... G01S 17/86 |
| 2019/0129436 | A1 | 5/2019 | Sun et al. |
| 2020/0111169 | A1 | 4/2020 | Halder et al. |
| 2020/0150650 | A1 | 5/2020 | Jarlengrip |
| 2020/0150687 | A1 | 5/2020 | Halder et al. |
| 2020/0310442 | A1 | 10/2020 | Halder et al. |
| 2021/0017738 | A1 | 1/2021 | Sano |
| 2021/0191409 | A1 | 6/2021 | Ready-Campbell et al. |
| 2021/0254308 | A1 | 8/2021 | Thibblin et al. |
| 2021/0286924 | A1* | 9/2021 | Wyrwas .............. G06F 11/3664 |
| 2021/0317633 | A1 | 10/2021 | Sherlock |
| 2022/0024485 | A1 | 1/2022 | Theverapperuma et al. |
| 2022/0026921 | A1 | 1/2022 | Halder |
| 2022/0042286 | A1 | 2/2022 | Tsuji et al. |
| 2022/0057513 | A1 | 2/2022 | Pihl |
| 2022/0154431 | A1 | 5/2022 | Kurosawa |
| 2022/0340171 | A1 | 10/2022 | Halder |
| 2023/0134855 | A1 | 5/2023 | Hodel et al. |

FOREIGN PATENT DOCUMENTS

| | | |
|---|---|---|
| EP | 3852018 A1 | 7/2021 |
| EP | 4083335 A2 | 8/2022 |
| KR | 10-2022-0014477 | 12/2022 |
| WO | 2018099755 A1 | 6/2018 |
| WO | 2021/101241 A1 | 5/2021 |
| WO | 2021/183260 A1 | 9/2021 |
| WO | 2021/241716 A1 | 12/2021 |
| WO | 2022198331 A1 | 9/2022 |

OTHER PUBLICATIONS

ZED-F9P-04B u-blox F9 high precision GNSS module, May 3, 2022, retrieved on Aug. 22, 2022 from www.u-blox.com/sites/default/files/ZED-F9P-04B_DataSheet_UBX-21044850.pdf, 25 pages.
Digi XBee SX 868 Datasheet, retrieved on Aug. 22, 2022 from www.digi.com/resources/library/data-sheets/ds_xbee-sx-868, 2 pages.
ST LM217/LM317 Datasheet, Dec. 2021, retrieved on Aug. 22, 2022 from www.st.com/resource/en/datasheet/lm317.pdf, 34 pages.
St LD1117 Datasheet, Feb. 2020, retrieved on Aug. 22, 2022 from www.st.com/resource/en/datasheet/ld1117.pdf, 46 pages.
Texas Instruments TCAN33x 3.3-V CAN Transceivers With CAN FD, Dec. 2019, retrieved on Aug. 22, 2022 from www.ti.com/lit/gpn/TCAN334, 45 pages.
PJRC Teensy 4.1 Development Board, retrieved on Mar. 18, 2022 from www.pjrc.com/store/teensy41.html, 22 pages.
Fairchild Semiconductor ONSEMI N-Channel Logic Level Enhancement Mode Field Effect Transistor BSS138, Nov. 2021, retrieved on Aug. 22, 2022 from www.onsemi.com/pdf/datasheet/bss138-d.pdf, 7 pages.
NXP Semiconductors i.MX RT1060 Crossover MCU with Arm® Cortex®—M7 Core, retrieved on Aug. 22, 2022 from https://www.nxp.com/products/processors-and-microcontrollers/arm-microcontrollers/i-mx-rt-crossover-mcus/i-mx-/rt1060-crossover-mcu-with-arm-cortex-m7-core:i.MX-RT1060, 9 pages.
LIVOX LVX Specifications v1.1.0.0, 2019, retrieved on Aug. 22, 2022 from www.livoxtech.com/3296f540ecf5458a8829e01cf429798e/downloads/Livox Viewer/LVX Specifications EN_20190924.pdf, 12 pages.
Inductive Proximity Sensor LJ12A3-4-Z/BX, retrieved on Aug. 22, 2022 from datasheetspdf.com/pdf-file/1096182/ETT/LJ12A3-4-Z/1, 1 page.
Brianna Wessling, "Teleo announces $12M in Series A funding", Jun. 13, 2022, retrieved on Jun. 20, 2022 from www.therobotreport.com/teleo-announces-12m-in-series-a-funding/, 10 pages.
Frank Tobe, "Blue River Technology sells to Deere for $305 million", Sep. 7, 2017, retrieved on Jun. 20, 2022 from www.therobotreport.com/startup-blue-river-technology-sells-deere-305-million/, 12 pages.
Steve Crowe, "John Deere Acquires Light's Camera-Based Perception Platform", May 19, 2022, retrieved on Jun. 20, 2022 from www.therobotreport.com/john-deere-acquires-light-camera-based-perception-platform/, 12 pages.
TRL Off-Highway Automated Vehicles Code Of Practice, 2021, retrieved on Aug. 22, 2022 from trl.co.uk/uploads/trl/documents/PPR994-Off-Highway-AV-CoP_v3.pdf, 40 pages.
Steve Crowe, "John Deere Acquiring Bear Flag Robotics For $250M", Aug. 5, 2021, retrieved on Jun. 20, 2022 from www.therobotreport.com/john-deere-acquiring-bear-flag-robotics-250m/, 11 pages.
Steve Crowe, "Oxbotica Pilots Safety Framework For Off-Road Autonomous Driving", Jun. 7, 2021, retrieved on Jun. 20, 2022 from www.therobotreport.com/oxbotica-pilots-safety-framework-off-road-autonomous-driving/, 11 pages.
Brianna Wessling, "MIT Researchers Help Robots Navigate Uncertain Environments", May 24, 2022, retrieved on Jun. 20, 2022 from www.therobotreport.com/mit-researchers-help-robots-navigate-uncertain-environments/, 10 pages.
Carnegie Mellon University National Robotics Engineering Center—Off-Road Autonomy, retrieved on Aug. 22, 2022 from https://www.nrec.ri.cmu.edu/solutions/defense/other-projects/off-road-autonomy.html, 5 pages.
Greg Nichols, "Off Road: Autonomous Driving's New Frontier Requires A New Kind Of Sensor", Apr. 14, 2021, retrieved on Jun. 20, 2022 from www.zdnet.com/article/off-road-autonomous-drivings-new-frontier-requires-a-new-kind-of-sensor/, 15 pages.
Tagolas Magma X2 Datasheet, retrieved on Aug. 22, 2022 from www.taoglas.com/datasheets/AA.175.301111.pdf, 20 pages.
LIVOX Mid-40/Mid-100 LiDAR Specs, retrieved on Aug. 22, 2022 from https://www.livoxtech.com/mid-40-and-mid-100/specs, 2 pages.
Elaine Ball, "Top Benefits Of Using LiDAR For Construction Projects", Oct. 1, 2020, retrieved from https://csengineermag.com/top-benefits-of-using-lidar-for-construction-projects/ on Nov. 4, 2022, 4 pages.
"Press Release: Baraja Announces First Volume Commercial LiDAR Deal With Hitachi Construction Machinery", Oct. 12, 2021, retrieved from https://www.baraja.com/en/blog/press-release-baraja-announces-first-volume-commercial-lidar-deal-with-hitachi-construction on Nov. 4, 2022, 6 pages.
Peter Brown, "LiDAR Improves Efficiency And Safety In Industrial Heavy Equipment", Oct. 22, 2021, retrieved from https://electronics360.globalspec.com/article/17336/lidar-improves-efficiency-and-safety-in-industrial-heavy-equipment on Nov. 4, 2022, 2 pages.
"Construction Remains Ahead In Autonomous Vehicles", Oct. 4, 2019, retrieved from https://www.constructionequipment.com/earthmoving/rigid-frame-trucks-off-highway/article/10756443/construction-remains-ahead-in-autonomous-vehicles on Nov. 4, 2022, 4 pages.
"LiDAR For Heavy Machinery", retrieved from https://innoviz.tech/applications/industrial on Nov. 4, 2022, 2 pages.
"Hitachi Construction Machinery Invests In Nextgen LiDAR . . . ", Mar. 29, 2021, retrieved from https://lidarnews.com/press-releases/hitachi-construction-machinery-invests-in-nextgen-lidar/ on Nov. 4, 2022, 2 pages.
Nakagawa et al., "Real-Time Mapping Of Construction Workers Using Multilayered LiDAR", The 40th Asian Conference On Remote Sensing 2019, Oct. 14-18, 2019, 8 pages.
Sabbir Rangwala, "LiDAR Vision—Helping Bring Autonomous Trucks To Your Neighborhood", Dec. 17, 2020, retrieved from https://www.forbes.com/sites/sabbirrangwala/2020/12/17/lidar-visionhelping-bring-autonomous-trucks-to-your-neighborhood/ on Nov. 4, 2022, 9 pages.
"Collision Warning On The Rear Of An Excavator With 3D LiDAR Sensors", retrieved from https://www.sick.com/ca/en/industries/mobile-automation/construction-and-mining-machines/excavator/collision-warning-on-the-rear-of-an-excavator-with-3d-lidar-sensors/c/p549945 on Nov. 4, 2022, 1 page.
"Autonomous Construction Vehicles", retrieved from https://www.technologycards.net/english/the-technologies/autonomous-construction-vehicles on Nov. 4, 2022, 2 pages.

* cited by examiner

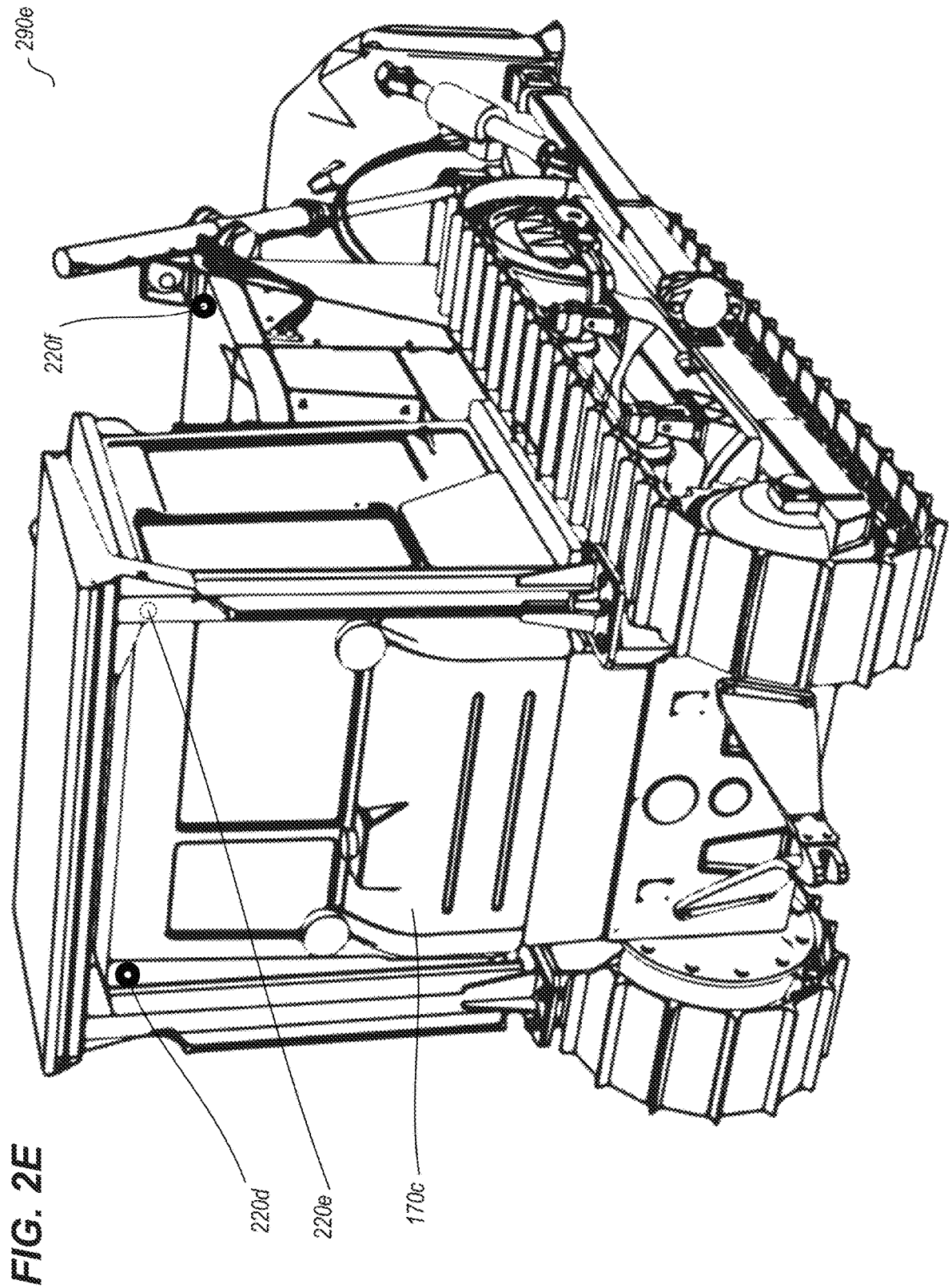

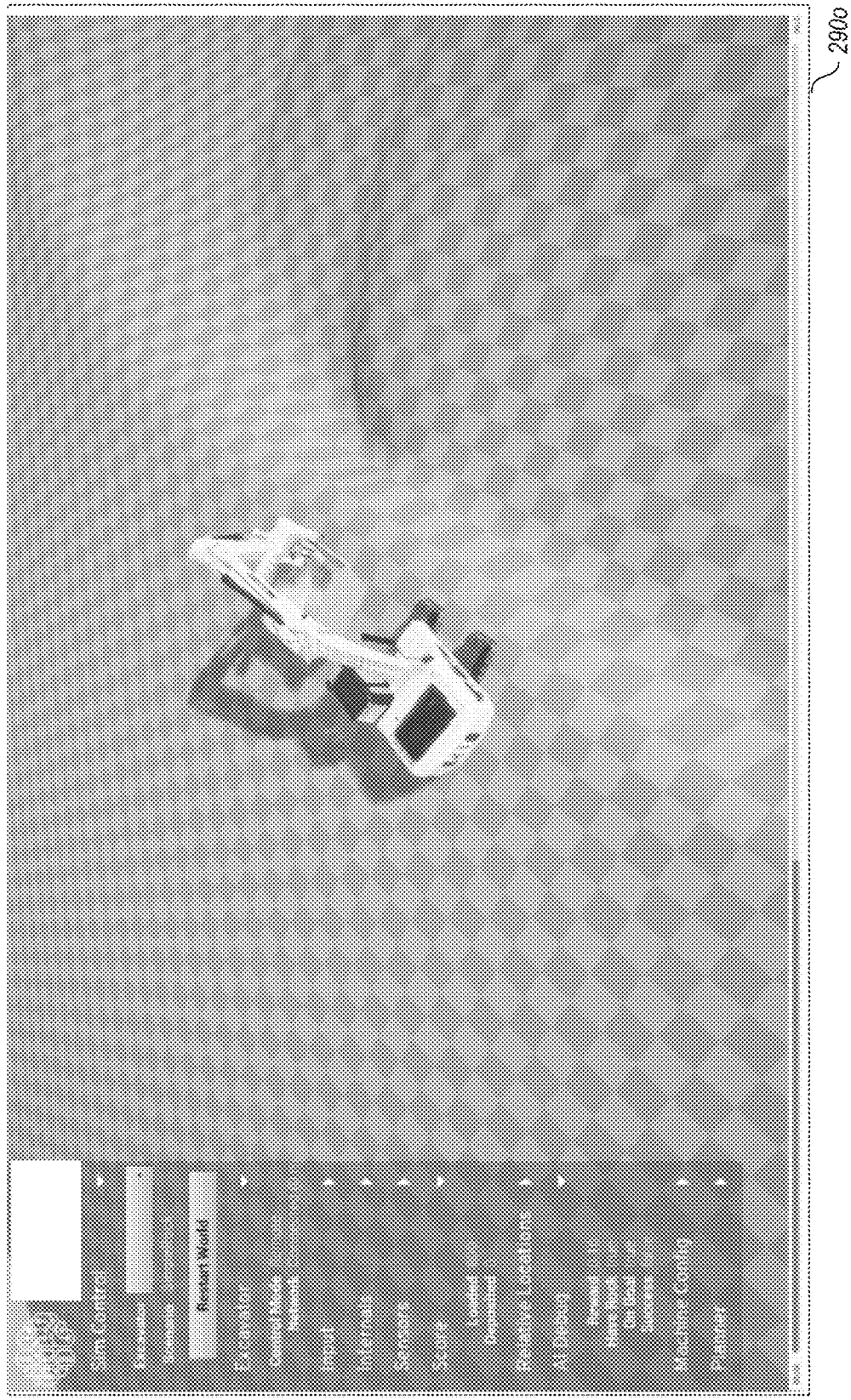
FIG. 2-O

| | tilt_x | tilt_y | tilt_z | angles_x | angles_y | angles_z | bucket_x | bucket_y | bucket_z |
|---|---|---|---|---|---|---|---|---|---|
| 275 | ... | | | | | | | | |
| 275a | -0.000321 | -0.00058 | -3.13013 | 0.424944 | -2.68346 | -0.46965 | -1.89194 | 0.134353 | 1.126755 |
| 275b | -0.000321 | -0.00058 | -3.13013 | 0.424944 | -2.68346 | -0.46965 | -1.89194 | 0.134353 | 1.126755 |
| 275c | -0.000321 | -0.00058 | -3.13013 | 0.424944 | -2.68346 | -0.46965 | -1.89194 | 0.134353 | 1.126755 |
| 275d | -0.003419 | -0.000546 | -3.12982 | 0.424878 | -2.68364 | -0.46975 | -1.89098 | 0.127374 | 1.12876 |
| 275e | -0.003419 | -0.000546 | -3.12982 | 0.424878 | -2.68364 | -0.46975 | -1.89098 | 0.127374 | 1.12876 |
| 275f | -0.003419 | -0.000546 | -3.12982 | 0.424878 | -2.68364 | -0.46975 | -1.89098 | 0.127374 | 1.12876 |
| | ... | | | | | | | | |
| 275g | 0.004599 | 0.01593 | 2.844442 | 0.057934 | -1.192202 | -0.5644 | -6.58638 | -1.89195 | -2.15599 |
| 275h | 0.004599 | 0.01593 | 2.844442 | 0.057934 | -1.192203 | -0.5644 | -6.58638 | -1.89195 | -2.15599 |
| 275i | 0.004599 | 0.01593 | 2.844442 | 0.057934 | -1.192202 | -0.5644 | -6.58638 | -1.89195 | -2.15599 |
| | ... | | | | | | | | |
| 275j | -0.000319 | 0.000547 | 2.516637 | 0.403479 | -1.136887 | -2.34415 | -4.78747 | -3.31185 | 1.906756 |
| 275k | -0.000319 | 0.000547 | 2.516637 | 0.403479 | -1.136887 | -2.34415 | -4.78747 | -3.31185 | 1.906756 |
| 275l | -0.000319 | 0.000547 | 2.516637 | 0.403479 | -1.136887 | -2.34415 | -4.78747 | -3.31185 | 1.906756 |

| | target_vec | target_vec | target_vec | have_rock | on_goal | stick_end_xyz | stick_end_xyz | stick_end_xyz |
|---|---|---|---|---|---|---|---|---|
| | ... | | | | | | | |
| 275a | -4.46814 | -1.910998 | -1.22771 | 0 | 0 | -3.45634 | 0.154482 | 1.802344 |
| 275b | -4.46814 | -1.910998 | -1.22771 | 0 | 0 | -3.45634 | 0.154482 | 1.802344 |
| 275c | -4.46814 | -1.910998 | -1.22771 | 0 | 0 | -3.45634 | 0.154482 | 1.802344 |
| 275d | -4.46878 | -1.908821 | -1.2247 | 0 | 0 | -3.45544 | 0.143446 | 1.804334 |
| 275e | -4.46878 | -1.908821 | -1.2247 | 0 | 0 | -3.45544 | 0.143446 | 1.804334 |
| 275f | -4.46878 | -1.908821 | -1.2247 | 0 | 0 | -3.45544 | 0.143446 | 1.804334 |
| 275g | 6.631897 | -3.3433 | 4.615462 | 1 | 0 | -6.76583 | -1.95503 | -0.46638 |
| 275h | 6.631897 | -3.3433 | 4.615462 | 1 | 0 | -6.76583 | -1.95503 | -0.46638 |
| 275i | 6.631897 | -3.3433 | 4.615462 | 1 | 0 | -6.76583 | -1.95503 | -0.46638 |
| 275j | 4.837532 | -1.929882 | 0.57547 | 1 | 1 | -6.16686 | -4.30654 | 2.016771 |
| 275k | 4.837532 | -1.929882 | 0.57547 | 1 | 1 | -6.16686 | -4.30654 | 2.016771 |
| 275l | 4.837532 | -1.929882 | 0.57547 | 1 | 1 | -6.16686 | -4.30654 | 2.016771 |
| | ... | | | | | | | |

*FIG. 2Q*

AUTONOMOUS CONTROL OF OPERATIONS OF EARTH-MOVING VEHICLES USING TRAINED MACHINE LEARNING MODELS

CROSS REFERENCE TO RELATED APPLICATIONS

This application claims the benefit of U.S. Provisional Patent Application No. 63/328,469, filed Apr. 7, 2022 and entitled "Autonomous Control Of Operations Of Earth-Moving Vehicles Using Trained Machine Learning Models," which is hereby incorporated by reference in its entirety.

TECHNICAL FIELD

The following disclosure relates generally to systems and techniques for autonomous control of operations of earth-moving vehicles, such as to use machine learning to train one or more behavioral models for one or more earth-moving construction and/or mining vehicles and to use the trained behavioral model(s) to determine and implement autonomous operations of at least one such earth-moving vehicle on a site that include determining and controlling movement of arms and/or attachments to move materials or perform other actions.

BACKGROUND

Earth-moving construction vehicles may be used on a job site to move soil and other materials (e.g., gravel, rocks, asphalt, etc.) and to perform other operations, and are each typically operated by a human operator (e.g., a human user present inside a cabin of the construction vehicle, a human user at a location separate from the construction vehicle but performing interactive remote control of the construction vehicle, etc.). Similarly, earth-moving mining vehicles may be used to extract or otherwise move soil and other materials (e.g., gravel, rocks, asphalt, etc.) and to perform other operations, and are each typically operated by a human operator (e.g., a human user present inside a cabin of the mining vehicle, a human user at a location separate from the mining vehicle but performing interactive remote control of the mining vehicle, etc.).

Limited autonomous operations (e.g., performed under automated programmatic control without human user interaction or intervention) of some construction vehicles have occasionally been used, but existing techniques suffer from a number of problems, including the use of limited types of sensed data, an inability to perform fully autonomous operations when faced with on-site obstacles, an inability to coordinate autonomous operations between multiple on-site construction vehicles, requirements for bulky and expensive hardware systems to support the limited autonomous operations, etc.

BRIEF DESCRIPTION OF THE DRAWINGS

FIGS. 2A-2I illustrate examples of earth-moving vehicles having multiple types of on-vehicle data sensors positioned to support autonomous operations on a site.

FIGS. 2K-2Q illustrate examples of performing simulations of operations of an earth-moving vehicle on a site.

DETAILED DESCRIPTION

Figure 1A:
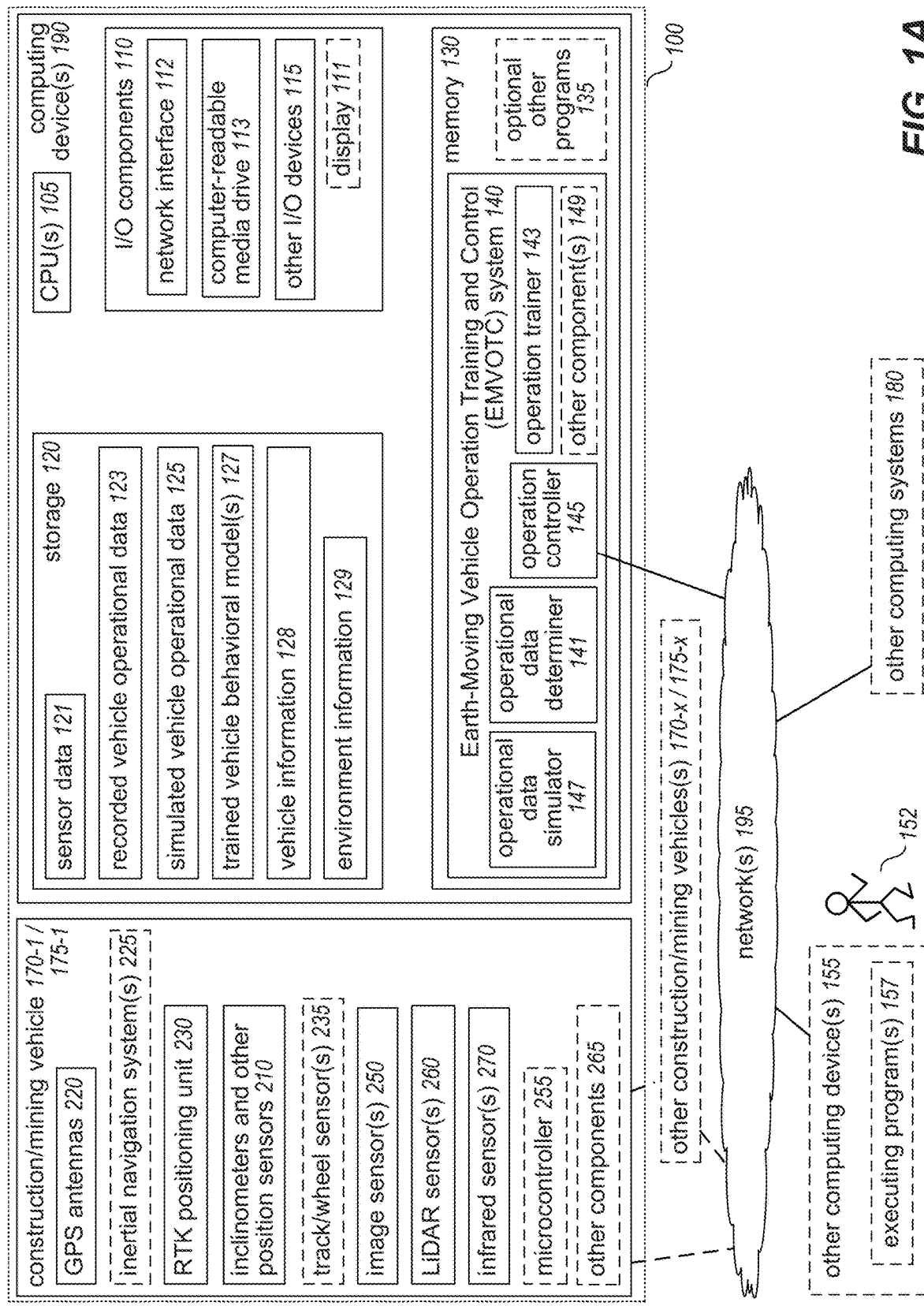
FIG. 1A is a network diagram illustrating an example embodiment of using described systems and techniques to determine and implement autonomous operations of one or more earth-moving vehicles on a site based at least in part on using one or more trained machine learning models.

Systems and techniques are described for implementing autonomous control of operations of earth-moving vehicles, such as to automatically determine and control movement of part or all of one or more earth-moving construction or mining vehicles (e.g., an excavator vehicle's boom arm and stick arm and attachment tool, such as a digging bucket, claw, hammer, etc.) to move materials or perform other actions. In at least some embodiments, the described systems and techniques are used to train one or more behavioral models for use in controlling autonomous operations of one or more earth-moving construction and/or mining vehicles (e.g., one or more tracked or wheeled excavators, bulldozers, front loaders, skip loaders, graders, cranes, backhoes, compactors, conveyors, trucks, deep sea machinery, extra-terrestrial machinery, etc.) in performing one or more defined tasks (e.g., dig a hole of a specified size and/or shape and/or at a specified location, move one or more rocks from a specified area, etc.) and/or other goals, including in at least some embodiments and situations to do so when faced with possible on-site obstacles (e.g., man-made structures, rocks and other naturally occurring impediments, other equipment, people or animals, etc.). The trained behavioral model(s) may then be used to determine and implement fully autonomous operations of one or more earth-moving vehicles, including in some embodiments and situations to implement coordinated actions of multiple such earth-moving vehicles (e.g., multiple excavator vehicles, an excavator vehicle and one or more other earth-moving vehicles of one or more other types, etc.). Additional details related to implementing autonomous control of earth-moving vehicles in particular manners are described below, and some or all of the described techniques are performed in at least some embodiments by automated operations of an Earth-Moving Vehicle Operation Training and Control ("EMVOTC") system to control one or more earth-moving vehicles (e.g., an EMVOTC system operating on at least one of the one or more earth-moving vehicles being controlled).

As noted above, automated operations of an EMVOTC system may include training one or more behavioral models for use in controlling autonomous operations of one or more earth-moving vehicles (e.g., vehicles of one or more types), and may further include determining and implementing actions to control movement of some or all of an earth-moving vehicle (e.g., the earth-moving vehicle's arms and attachment) to move materials or perform other actions for the one or more tasks on a job site or other geographical area, including to address any identified obstacles as part of doing so. In at least some embodiments, the trained behavioral model(s) are used to determine the specific movements and/or other actions of some or all of an earth-moving vehicle to accomplish a task (e.g., multiple behavioral models each associated with a type of task and/or type of earth-moving vehicle), and automated operations of the EMVOTC system may include training the behavioral models(s) using operational data and later using the trained behavioral model(s) to determine how to implement a particular task in a particular set of circumstances (e.g., starting conditions). For example, in some embodiments the EMVOTC system may further include one or more planner components, and at least one such planner component may be used to determine an optimal plan to complete a job having one or more tasks to be performed (e.g., in accordance with other goals or planning operations being performed by the EMVOTC system or a related system, such as based on an overall analysis of a site and/or as part of accomplishing a group of multiple activities at the site). In some embodiments, each behavioral model may be a multi-layered actor model that is implemented using a multi-layer neural network, and may be trained (e.g., using behavioral cloning techniques) to implement a task using a combination of actual data from actual human operation of one or more earth-moving vehicles to perform the task (e.g., multiple episodes of performing the task that each has data about the manipulation of the manual controls of the earth-moving vehicle to perform an instance of the task) and simulated data of operating an earth-moving vehicle to perform the task (e.g., multiple simulated episodes of performing the task using variations in starting conditions and/or control manipulations and each having data about manipulations of the earth-moving vehicle's controls to perform an instance of the task, and optionally with delay added to represent time for a simulated human operator to perform simulated manipulations of simulated controls of the earth-moving vehicle and/or to represent time corresponding to the simulated earth-moving vehicle responding to the simulated manipulations of the simulated controls), such as by using positive and/or negative training examples. In addition, the autonomous operations of the earth-moving vehicle to perform one or more tasks may be initiated in various manners, such as by an operator component of the EMVOTC system that acts in coordination with the one or more planner components (e.g., based on a planner component providing instructions to the operator component about current work to be performed, such as work for a current day that involves the earth-moving vehicle moving designated dirt or other materials, leaving a diggable area and moving to a new area to dig, etc.), or directly by a planner component. In other embodiments, determination of one or more target tasks to perform and initiation of corresponding earth-moving vehicle activities may be performed in other manners, such as in part or in whole based on input received from one or more human users or other sources. Additional details are included below regarding such automated operations to train a behavioral model for an earth-moving vehicle to perform a particular type of task and to use the trained behavioral model to implement one or more instances of that task type, including with respect to the examples of FIGS. 2K-2Q.

As one non-exclusive example related to training a behavioral model for a particular type of earth-moving vehicle (or particular earth-moving vehicle, such as a particular excavator vehicle) to control that type of vehicle (or particular vehicle) to perform a particular task (e.g., extract a specified quantity of material from a designated area and move it to a target destination, extract a rock or other obstacle and move it out of a designed area, etc.), automated operations of the EMVOTC system may include some or all of the following:

gathering actual data from actual operation by one or more humans of one or more corresponding earth-moving vehicles to perform the task (e.g., for a specified period of time, such as a specified number of minutes or hours or days; for a specified quantity of episodes of performing the task; etc.);

generating simulated data of operating one or more corresponding earth-moving vehicles to perform the task (e.g., for a specified quantity of episodes of performing the task; for a specified period of time; etc., including in at least some embodiments and situations to simulate initial conditions for an episode that include simulated data for some or all of the types of sensors and corresponding sensed data that are available);

sampling the actual and/or simulated data one or more times, such as to reduce the amount of data;

identifying and removing subsets of the actual and/or simulated data that do not correspond to relevant activities for the task (e.g., idle actions in which active control of the earth-moving vehicle does not occur, or in which active control of the earth-moving vehicle is for activities that are not directly part of performing the task);

packing the remaining actual and/or simulated data (e.g., after sampling and removing non-relevant activity data) via a sliding window technique, such as to repeatedly select and concatenate time-based subsets (in an amount based on the size of the sliding window);

randomizing the order of the remaining actual and/or simulated data (e.g., after packing), such as by shuffling data corresponding to different episodes into a random order (e.g., to prevent training bias);

removing and saving a validation data subset of the remaining actual and/or simulated data (e.g., data for 20% of the episodes after the randomizing) for use in validating the trained model after the training;

optionally removing and saving a test data subset of the remaining actual and/or simulated data (e.g., data for 10% of the episodes after the randomizing) for use in testing the trained model after the validating;

normalizing the remaining actual and/or simulated data, such as to use consistent measurements and scales;

for each episode in the remaining actual and/or simulated data, determining a first subset of the data corresponding to input to the behavior model and a second subset of the data corresponding to expected output from the behavioral model, supplying the input data subset for the episode to the behavioral model, identifying differences between the corresponding output from the behavioral model and the expected output data for the output, and using the differences to train the behavioral model (e.g., to perform error or loss backpropagation to adjust internal weights or other attributes of the behavioral model) to learn improved performance, such as to measure error or loss based on some or all of mean squared distance between one or more vectors (e.g., between expected and actual vectors for movement of one or more of the excavator boom, bucket, cabin, arm, etc.), size of one or more of the vectors, one or more non-movement states of at least one earth-moving vehicle to be controlled, etc., such as to square and add the differences for each of the vector(s) and then take the square root of that sum;

after some or all of the training is performed, using the validation data subset to measure accuracy of performance of the trained behavioral model (e.g., supplying an input data subset of the validation data to the trained behavioral model, and determining if the actual output of the trained behavioral model matches expected output data of the validation data, such as within a defined difference threshold) and optionally performing further training of the behavioral model if the training is not complete (e.g., if the performance is below a defined performance threshold, such as a specified accuracy percentage); etc. In addition, while in some embodiments and situations a behavioral model may be first trained and then subsequently used, in other embodiments and situations the training may be repeated (e.g., ongoing) after one or more uses, such as to improve performance, to adapt to changing circumstances, etc. Furthermore, in some embodiments and situations, a single behavioral model may be trained and used to control autonomous operations of multiple earth-moving vehicles (e.g., multiple earth-moving vehicles of a single type, earth-moving vehicles of multiple types, etc.) to perform a task, while in other embodiments and situations the performance of such a task may include using a separate trained behavioral model for each type of earth-moving vehicle (or particular earth-moving vehicle) and coordinating the actions of the multiple earth-moving vehicles via other automated operations of the EMVOTC system.

In addition, a behavioral model may have various forms in various embodiments, including in some embodiments to be implemented as a multi-layer actor model and/or to use a multi-layer neural network, such as a neural network having some or all of the following layers:

an input sequential layer with one or more nodes that receive packed input data that represents some or all of one or more episodes of actual and/or simulated data (e.g., packed input data for one or more sliding windows, representing states of initial conditions for the earth-moving vehicle and surrounding environment) and that extract packed data (e.g., to capture underlying time structures), with outputs being generated logits (e.g., unnormalized outputs or predictions);

one or more first hidden neural network layers with one or more nodes to represent the state inputs and that receive the logits of the sequential neural network layer as inputs and that generate additional logits as outputs; a concatenation layer with one or more nodes that receive and merge the hidden layer logits with the sequential layer logits and outputs the merged logits; one or more second hidden neural network layers with multiple nodes that receive and further process the output logits of the concatenation layer and generates a combination of states and logits as outputs;

an output layer with multiple nodes to convert outputs of the second hidden layer(s) to actions (e.g., activation functions) to be performed by the earth-moving vehicle; etc. It will be appreciated that other behavioral model structures and/or training activities may be performed in other embodiments and situations.

In at least some embodiments, the use of a combination of actual data and simulated data (e.g., very large scale simulated data, such as for hundreds or thousands or millions of episodes with varied conditions and actions, including to introduce a variety of realistic variations and to allow experimentation that exceeds that practically available from only actual data) and trained behavioral model(s) in the manners described herein allows the EMVOTC system to use the trained behavioral model(s) to perform autonomous control of the operations of one or more corresponding earth-moving vehicles in a manner that exceeds human operator capabilities, such as to operate with greater-than-human speed and/or precision and/or accuracy and/or safety. In addition, in at least some such embodiments, a transfer learning solution is used that bootstraps a behavioral model trained using simulated data to perform autonomous control of an actual earth-moving vehicle (e.g., to improve that trained behavioral model over time using further data obtained from the actual autonomously controlled operation of the vehicle).

The described techniques provide various benefits in various embodiments, including to improve the control of autonomous operations of earth-moving vehicles (e.g., fully autonomous operations), such as based at least in part on training one or more machine learning behavior model(s) to control corresponding autonomous operations of one or more corresponding earth-moving vehicles, such as by simulating data for operating one or more such earth-moving vehicles (e.g., one or more earth-moving vehicle types) and on using the data from simulated operations as part of the training, optionally in combination with actual operational data from operation of one or more actual earth-moving vehicles—the described techniques may provide benefits by, for example, performing the training faster, using less hardware resources, and providing more robust and accurate trained models due to the greater variability provided by the simulated operational data. In at least some such embodiments, the training may be enhanced by simulating various alternatives and evaluating the alternatives. Furthermore, such automated techniques allow such trained behavioral model(s) to be used to control autonomous operations that are performed more quickly and with greater accuracy, including to significantly reduce computing power and time used. In addition, in some embodiments the described techniques may be used to provide an improved GUI in which a user may more accurately and quickly obtain information about operations of earth-moving vehicles. Various other benefits are also provided by the described techniques, some of which are further described elsewhere herein.

In at least some embodiments, data may be obtained and used by the EMVOTC system from sensors of multiple types positioned on or near one or more earth-moving vehicles, such as one or more of GPS location data, track and cabin heading data, visual data of captured image(s), depth data from LiDAR and/or other depth-sensing and proximity devices, infrared data, real-time kinematic positioning information based on GPS data and/or other positioning data, inclinometer data for particular moveable parts of an earth-moving vehicle (e.g., the digging boom/arm/attachment of an excavator vehicle), etc. For example, one or more types of GPS antennas and associated components may be used to determine and provide GPS data in at least some embodiments, with one non-exclusive example being a Taoglas MagmaX2 AA.175 GPS antenna. In addition, one or more types of LiDAR devices may be used in at least some embodiments to determine and provide depth data about an environment around an earth-moving vehicle (e.g., to determine a 3D, or three-dimensional, model of some or all of a job site on which the vehicle is situated), with non-exclusive examples including LiDAR sensors of one or more types from Livox Tech. (e.g., Mid-70, Avia, Horizon, Tele-15, Mid-40, HAP, etc.) and with corresponding data optionally stored using Livox's LVX point cloud file format v1.1—in some embodiments, other types of depth-sensing and/or 3D modeling techniques may be used, whether in addition to or instead of LiDAR, such as using other laser rangefinding techniques, synthetic aperture radar or other types of radar, sonar, image-based analyses (e.g., SLAM, SfM, etc.), structured light, etc. Furthermore, one or more proximity sensor devices may be used to determine and provide short-distance proximity data in at least some embodiments, with one non-exclusive example being an LJ12A3-4-Z/BX inductive proximity sensor from ETT Co., Ltd. Moreover, real-time kinematic positioning information may be determined from a combination of GPS data and other positioning data, with one non-exclusive example including use of a u-blox ZED-F9P multi-band GNSS (global navigation satellite system) RTK positioning component that receives and uses GPS, GLONASS, Galileo and BeiDou data, such as in combination with an inertial navigation system (with one non-exclusive example including use of MINS300 by BW Sensing) and/or a radio that receives RTK correction data (e.g., a Digi XBee SX 868 RF component). Other hardware components that may be positioned on or near an earth-moving vehicle and used to provide data and/or functionality used by the EMVOTC system include the following: one or more inclinometers (e.g., single axis and/or double axis) or other accelerometers (with one non-exclusive example including use of an inclination sensor by DIS sensors, such as the QG76 series); a CAN bus message transceiver (e.g., a TCAN 334 transceiver with CAN flexible data rate); one or more low-power microcontrollers (e.g., an i.MX RT1060 Arm-based Crossover MCU microprocessor from NXP Semiconductors, a PJRC Teensy 4.1 Development Board, a Grove 12-bit Magnetic Rotary Position Sensor AS5600, etc.), such as to execute and use executable software instructions and associated data of the EMVOTC system; one or more voltage converters and/or regulators (e.g., an ST LD1117 adjustable and fixed low drop positive voltage regulator, an ST LM217 or LM317 adjustable voltage regulator, etc.); a voltage level shifter (e.g., a Fairchild Semiconductor BSS138 N-Channel Logic Level Enhancement Mode Field Effect Transistor); etc. In addition, in at least some embodiments and situations, one or more types of data from one or more sensors positioned on an earth-moving vehicle may be combined with one or more types of data (whether the same types of data and/or other types of data) acquired from one or more positions remote from the earth-moving vehicle (e.g., from an overhead location, such as from a drone aircraft, an airplane, a satellite, etc.; elsewhere on a site on which the earth-moving vehicle is located, such as at a fixed location and/or on another earth-moving vehicle; etc.), with the combination of data used in one or more types of autonomous operations as discussed herein. Additional details are included below regarding positioning of multiple types of data sensors and use of corresponding data, including with respect to the examples of FIGS. 2A-2I.

As is also noted above, automated operations of an EMVOTC system may include determining current location and other positioning of an earth-moving vehicle on a site in at least some embodiments. As one non-exclusive example, such position determination may include using one or more track sensors to monitor whether or not the earth-moving vehicle's tracks are aligned in the same direction as the cabin, and using GPS data (e.g., from 3 GPS antennas located on an earth-moving vehicle cabin, such as in a manner similar to that described with respect to FIG. 2B) in conjunction with inertial navigation system to determine the rotation of the cabin chassis (e.g., relative to true north), as well as to determine an absolute location of the vehicle's body and/or other parts. When using data from multiple GPS antennas, the data may be integrated in various manners, such as by using a microcontroller located on the earth-moving vehicle (e.g., using the 'Sparkfun' GPS Arduino library from u-blox for the GPS receiver), and with additional RTK (real-time kinematic) positioning data used to provide an RTK-enabled GPS positioning unit that reinforces and provides further precision with respect to the GPS-based location (e.g., to achieve 1-inch precision or better). In addition, in some embodiments and situations, LiDAR data is used to assist in position determination operations, such as by surveying the surroundings of the earth-moving vehicle (e.g., an entire job site on which the earth-moving vehicle is located) and confirming a current location of the earth-moving vehicle (e.g., relative to a three-dimensional, or 3D, map of the job site generated from the LiDAR data). Additional details are included below regarding such automated operations to determine current location and other positioning of an earth-moving vehicle on a site.

Automated operations of an EMVOTC system may further in at least some embodiments include identifying and classifying obstacles (if any) involved in accomplishing one or more tasks, including in some embodiments and situations as part of moving an earth-moving vehicle along a desired route or otherwise between current and destination locations. For example, LiDAR data (or other depth-sensing data) and/or visual data may be analyzed to identify objects that are possible obstacles and as part of classifying a type of each obstacle, and other types of data (e.g., infrared) may be further used as part of classifying an obstacle type (e.g., to determine whether an obstacle is a human or animal, such as based at least in part by having a temperature above at least one first temperature threshold, whether an absolute temperature threshold or a temperature threshold relative to a temperature of a surrounding environment; whether an obstacle is a running vehicle, such as based at least in part by having a temperature above at least one second temperature threshold, whether an absolute temperature threshold or a temperature threshold relative to a temperature of a surrounding environment; etc.), and in some embodiments and situations by using one or more trained machine learning models (e.g., using a point cloud analysis routine for object classification) or via other types of analysis (e.g., image analysis techniques). As one non-exclusive example, each obstacle may be classified on a scale from 1 (easy to remove) to 10 (not passable), including to consider factors such as whether an obstacle is a human or other animal, is another vehicle that can be moved (e.g., using coordinated autonomous operation of the other vehicle), is infrastructure (e.g., cables, plumbing, etc.), based on obstacle size (e.g., using one or more size thresholds) and/or obstacle material (e.g., is water, oil, soil, rock, etc.) and/or other obstacle attribute, etc. If movement between locations is included as part of accomplishing a task, such classifying of obstacles may further be used as part of determining a route between a current location and a target destination location, such as to determine an alternative route to use if one or more obstacles of a sufficiently high classified type (e.g., of class 7 or higher) are present along what would otherwise be the initially determined route (e.g., a direct linear path). For example, depending on information about an obstacle (e.g., a type, distance, shape, depth, etc.), the automated operations of the EMVOTC system may determine to, as part of the autonomous operations of the earth-moving vehicle, perform at least one of (1) removing the obstacle and moving in a direct path to the target destination location, or (2) moving in an optimized path around the obstacle to the target destination location, or (3) inhibiting movement of the earth-moving vehicle, and in some cases, to instead initiate autonomous operations of a separate second earth-moving vehicle to move to the target destination location and/or to initiate a request for human intervention.

In addition, while the autonomous operations of an earth-moving vehicle controlled by the EMVOTC system may in some embodiments be fully autonomous and performed without any input or intervention of any human users, in other embodiments the autonomous operations of an earth-moving vehicle controlled by the EMVOTC system may include providing information to one or more human users about the operations of the EMVOTC system and optionally receiving information from one or more such human users (whether on-site or remote from the site) that are used as part of the automated operations of the EMVOTC system (e.g., one or more target tasks, a high-level work plan, etc.), such as via one or more GUIs ("graphical user interfaces") displayed on one or more computing device that provide user-selectable controls and other options to allow a user to interactively request or specify types of information to display and/or to interactively provide information for use by the EMVOTC system.

In one non-exclusive embodiment, a system and techniques may be provided that is used for controlling an earth-moving vehicle at an excavation site or other job site (e.g., to implement fully autonomous operations to perform one or more defined tasks, such as by configuring and using a machine learning model for planning an excavation based at least in part on behavioral cloning techniques), such as by performing activities (e.g., a computer-implemented method) including at least: receiving, by one or more computing systems, actual operational data that represents actual movements of an earth-moving vehicle during a plurality of actual episodes each involving performance of one or more tasks under control of a human operator; receiving, by the one or more computing systems and from a simulator, simulated operational data that represents simulated movements of the earth-moving vehicle during a plurality of simulated episodes each involving simulated performance of the one or more tasks; preparing, by the one or more computing systems, the actual and simulated operational data for use in training a multi-layer neural network, including generating reduced operational data by removing a subset of the sampled operational data that is generated during one or more time periods while the earth-moving vehicle is not performing movements corresponding to performance of the one or more tasks; training, by the one or more computing systems, the multi-layer neural network, including supplying input data from the reduced operational data to the multi-layer neural network and using differences between expected output data from the reduced operational data and actual output of the multi-layer neural network from the supplied input data to improve performance of the trained multi-layered actor model; and providing, by the one or more computing systems and after the validating, the trained multi-layer neural network for use in controlling further actual movements of the earth-moving vehicle during autonomous operations to perform one or more further tasks without input by any human operators. The activities of this non-exclusive embodiment may further include receiving, by one or more computing systems, actual operational data that represents actual movements of an earth-moving vehicle during a plurality of actual episodes each involving performance of one or more tasks under control of a human operator, wherein the one or more tasks include picking up one or more objects in an environment surrounding the earth-moving vehicle and moving the picked-up one or more objects from one or more current locations to one or more target destination locations; receiving, by the one or more computing systems and from a simulator, simulated operational data that represents simulated movements of the earth-moving vehicle during a plurality of simulated episodes each involving simulated performance of the one or more tasks; preparing, by the one or more computing systems, the actual and simulated operational data for use in training a multi-layered actor model implemented using a multi-layer neural network, including generating, by the one or more computing systems, sampled operational data by sampling the actual operational data using a first frequency and by sampling the simulated operational data using a second frequency (optionally the same as the first frequency, such as, for example, 10 hertz for one or both frequencies, or optionally higher or lower depending on an amount of computing resources available and/or amount of time for performing the sampling), and generating, by the one or more computing systems, reduced operational data by removing a subset of the sampled operational data that is generated during one or more time periods while the earth-moving vehicle is not performing movements corresponding to performance of the one or more tasks, and generating, by the one or more computing systems, normalized operational data by normalizing values in the reduced operational data according to one or more defined metrics, and generating, by the one or more computing systems, randomized operational data by changing, in the normalized operational data, ordering of data corresponding to at least some actual and simulated episodes, and generating, by the one or more computing systems, a training data subset and a validation data subset from the randomized operational data, including selecting separate portions of the randomized operational data for use as the training and validation data subsets, and generating, by the one or more computing systems, packed training data by packing the training data subset for transmission, and packed validation data by packing the validation data subset for transmission; training, by the one or more computing systems, the multi-layered actor model, including supplying input data encoded in the packed training data to the multi-layer neural network and using differences between expected output data encoded in the packed training data and actual output of the multi-layer neural network from the supplied input data to improve performance of the trained multi-layered actor model, including backpropagating calculated loss through the multi-layer neural network to update weights of the multi-layer neural network; validating, by the one or more computing systems, performance of the trained multi-layered actor model, including supplying further input data encoded in the packed validation data to the trained multi-layer neural network, and determining that further differences between further expected output data encoded in the packed validation data and further actual output of the multi-layer neural network from the supplied further input data are below one or more validation thresholds; and providing, by the one or more computing systems and after the validating, the trained multi-layered actor model for use in controlling further actual movements of the earth-moving vehicle during autonomous operations to perform one or more further tasks without input by any human operators. The activities of this non-exclusive embodiment may further include providing of the trained multi-layered actor model by determining, by the one or more computing systems, one or more further actual movements of the earth-moving vehicle based at least in part on submitting initial condition information to the trained multi-layered actor model corresponding to at least one further task; and initiating, by the one or more computing systems, fully autonomous operations of the earth-moving vehicle to perform the one or more further actual movements of the earth-moving vehicle. The activities of this non-exclusive embodiment may further include, with respect to the multi-layer neural network, having it include an input sequential neural network layer having one or more nodes to receive packed input data encoded and to extract underlying time structures and generate corresponding logits; at least one first hidden neural network layer having one or more nodes to receive the logits of the input sequential neural network layer and to generate additional logits as outputs; a concatenation layer having one or more nodes to receive and merge the additional logits of the at least one first hidden neural network layer with the logits of the input sequential neural network layer and to output corresponding merged logits; at least one second hidden neural network layer having one or more nodes to receive the merged logits with the sequential layer logits and to output a generated combination of states and logits; and an output neural network layer having one or more nodes to receive the generated combination of states and logits and to generate information about one or more movements of the earth-moving vehicle to be implemented. The activities of this non-exclusive embodiment may further include preparing of the actual and simulated operational data further including, before the generating of the sampled operational data, reducing the actual operational data by sampling the actual operational data in a predetermined frequency. The activities of this non-exclusive embodiment may further include generating the calculated loss based on the differences between the expected output data and the actual output using one or more mean squared distances between expected and actual vectors for movement of one or more of a boom of the earth-moving vehicle or a cabin of the earth-moving vehicle or an arm of the earth-moving vehicle or a bucket of the earth-moving vehicle or a non-bucket attachment of the earth-moving vehicle, and/or using one or more sizes of at least one of the expected or actual vectors, and/or using one or more non-movement states of the earth-moving vehicle. The activities of this non-exclusive embodiment may further include receiving of the actual operational data by receiving first actual operational data that represents first actual earth-moving vehicle movements during a first plurality of actual episodes each involving performance of one or more tasks under control of a first human operator, receiving second actual operational data that represents second actual earth-moving vehicle movements during a second plurality of actual episodes each involving performance of one or more tasks under control of a second human operator, and merging the first and second actual operational data to form the actual operational data that is prepared for use in training the multi-layered actor model. The activities of this non-exclusive embodiment may further include receiving, by the one or more computing systems, terrain data from sampling an environment surrounding the earth-moving vehicle, and including the terrain data as part of the actual operational data. The activities of this non-exclusive embodiment may further occur wherein the one or more objects include one or more rocks and/or wherein the one or more tasks further include removing one or more obstacles. The activities of this non-exclusive embodiment may further include executing, by the one or more computing systems, software instructions of an Earth-Moving Vehicle Operation Training and Control system to cause at least one of the receiving of the actual operational data, or the receiving of the simulated operational data, or the preparing of the actual and simulated operational data, or the training of the multi-layered actor model, or the validating of the performance of the trained multi-layered actor model, or the providing of the trained multi-layered actor model, or generating of the simulated operational data. The activities of this non-exclusive embodiment may further be implemented by a system comprising one or more hardware processors; a plurality of sensors mounted on an earth-moving vehicle to obtain vehicle data about the earth-moving vehicle, including a real-time kinematic (RTK)-enabled positioning unit using GPS data from one or more GPS antennas on the cabin of the earth-moving vehicle, and one or more inclinometers; a plurality of additional sensors to obtain environment data about an environment surrounding the earth-moving vehicle, including at least one of one or more LiDAR sensors, or one or more image capture devices; and one or more storage devices having software instructions that, when executed by at least one processor of the one or more hardware processors, cause the at least one processor to perform automated operations to implement any or all of the activities described above, and optionally further comprising the earth-moving vehicle. The activities of this non-exclusive embodiment may further include be implemented using stored contents on a non-transitory computer-readable medium that cause one or more computing devices to perform automated operations to implement any or all of the activities described above.

For illustrative purposes, some embodiments are described below in which specific types of data are acquired and used for specific types of automated operations performed for specific types of earth-moving vehicles, and in which specific types of autonomous operation activities are performed in particular manners. However, it will be understood that such described systems and techniques may be used with other types of data and vehicles and associated autonomous operation activities in other manners in other embodiments, and that the invention is thus not limited to the exemplary details provided. In addition, the terms "acquire" or "capture" or "record" as used herein with reference to sensor data may refer to any recording, storage, or logging of media, sensor data, and/or other information related to an earth-moving vehicle or job site or other location or subsets thereof (unless context clearly indicates otherwise), such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts. In addition, the EMVOTC system may in some embodiments be separated or otherwise specialized into more specific systems that control autonomous operations of specific types of earth-moving vehicles, with non-exclusive examples including an Excavator Operation Training and Control ("EOTC") system to control one or more excavator vehicles (e.g., an EOTC system operating on at least one of the one or more excavator vehicles being controlled), a CVMC (Construction Vehicle Operation Training and Control) system to control one or more earth-moving vehicles of one or more types (e.g., a CVOTC system operating on at least one of one or more non-excavator earth-moving vehicles being controlled), an MVMC (Mining Vehicle Operation Training and Control) system to control one or more mining vehicles of one or more types (e.g., an MOTC system operating on at least one of one or more mining vehicles being controlled), etc.

FIG. 1A is a diagram illustrating an example embodiment of an EMVOTC ("Earth-Moving Vehicle Operation Training and Control") system 140 that may be used to implement at least some of the described systems and techniques for implementing autonomous control of earth-moving vehicle earth-moving vehicles, such as to automatically determine and control movement of an earth-moving vehicle's arm(s) (e.g., hydraulic arms) and attachment (e.g., digging bucket) to move materials or perform other actions in accordance with specified tasks. The EMVOTC system 140 may be implemented on one or more network-accessible configured computing devices 190, whether integrated 100 with a particular earth-moving construction vehicle 170-1 and/or earth-moving mining vehicle 175-1 (e.g., located on that earth-moving vehicle) or with multiple earth-moving vehicles 170-x/175-x (e.g., that include earth-moving vehicle 170-1/175-1 and one or more other earth-moving vehicles, operating in a distributed manner on the multiple vehicles, such as one computing device 190 on each of the multiple vehicles that are interacting in a peer-to-peer manner), or instead remote from one or more such earth-moving vehicles (e.g., in communication with one or more such earth-moving vehicles over one or more networks 195). In some embodiments, one or more other computing devices or systems may further interact with the EMVOTC system 140 (e.g., to obtain and/or provide information), such as one or more other computing devices 155 each having one or more associated users 152, and/or one or more other computing systems 180 (e.g., to store and provide data, to provide supplemental computing capabilities, etc.). The one or more computing devices 190 may include any computing device or system that may receive data and/or requests, and take corresponding actions (e.g., store the data, respond to the request, etc.) as discussed herein.

In particular, in this example, the earth-moving vehicle 170-1/175-1 includes a variety of sensors to obtain and determine information about the earth-moving vehicle and its surrounding environment (e.g., a job site on which the earth-moving vehicle is located), including one or more GPS antennas 220, an RTK-enabled GPS positioning unit 230 that receives GPS signals from the GPS antenna(s) and RTK-based correction data from a remote base station (not shown) and optionally other data from one or more other sensors and/or devices (e.g., optional inertial navigation system 225), one or more inclinometers and/or other position sensors 210, optionally one or more track sensors 235, one or more image sensors 250 (e.g., part of one or more cameras or other image capture devices), one or more LiDAR emitters and/or sensors 260, one or more infrared sensors 270, one or more microcontrollers or other hardware CPUs 255, etc. —in at least some embodiments and situations, the microcontroller(s) 255 on an earth-moving vehicle may be some or all of the CPU(s) 105 of one or more computing devices 190, such as if those computing devices are located on that earth-moving vehicle.

The EMVOTC system 140 obtains some or all of the data from the sensors on the earth-moving vehicle 170-1/175-1, stores the data in corresponding databases or other data storage formats on storage 120 (e.g., sensor data 121, earth-moving vehicle information 128, environment information 129, etc.), and uses the data to perform automated operations involving controlling autonomous operations of the earth-moving vehicle 170-1/175-1. In this example embodiment, the EMVOTC system 140 has components that include an operational data determiner component 141 (e.g., to obtain actual operational data 123 and/or simulated operational data 125 for the earth-moving vehicle(s) 170-x/175-x and to prepare that data for use in training one or more behavioral models 127), an operational data simulator component 147 (e.g., to generate the simulated operational data), an operation trainer component 143 (e.g., to use the prepared operational data to train the behavioral model(s) 127), and an operational controller component 145 that uses the trained behavioral model(s) to control autonomous operation of the earth-moving vehicle(s) 170-x/175-x to perform one or more determined tasks. While not illustrated here, the EMVOTC system may further include components and/or capabilities to perform additional automated operations, such as controlling overall operation of the EMVOTC system (e.g., the use of the various components and/or capabilities), analyzing information about potential obstacles in an environment of the earth-moving vehicle(s) 170-x/175-x and determining corresponding information (e.g., a classification of the type of the obstacle), a motion planner component determining how to accomplish a goal that includes moving the earth-moving vehicle(s) 170-x/175-x from current location(s) to determined target destination location(s) (e.g., determining how to handle any possible obstacles between the current and destination locations), etc. During operation, the EMVOTC system may generate or otherwise obtain various types of additional data and optionally store that additional data on storage 120 or elsewhere, such as current location and/or positioning information for an earth-moving vehicle (e.g., as part of earth-moving vehicle information 128), a destination location, one or more determined routes, obstacle classification data, etc. Additional details related to the operation of the EMVOTC system 140 are included elsewhere herein.

In this example embodiment, the one or more computing devices 190 include a copy of the EMVOTC system 140 stored in memory 130 and being executed by one or more hardware CPUs 105, and the memory may further include one or more optional other executing software programs 135—software instructions of the EMVOTC system 140 may further be stored on storage 120 (e.g., for loading into memory 130 at a time of execution), but are not illustrated here. The computing device(s) 190 and EMVOTC system 140 may be implemented using a plurality of hardware components that form electronic circuits suitable for and configured to, when in combined operation, perform at least some of the techniques described herein. In the illustrated embodiment, each computing device 190 includes the one or more hardware CPUs (e.g., microprocessors), storage 120, memory 130, and various input/output ("I/O") components 110, with the illustrated I/O components including a network connection interface 112, a computer-readable media drive 113, optionally a display 111, and other I/O devices 115 (e.g., keyboards, mice or other pointing devices, microphones, speakers, etc.), although in other embodiments at least some such I/O components may not be provided (e.g., if the CPU(s) include one or more microcontrollers). The other computing devices 155 and computing systems 180 may include hardware components similar to those of a computing device 190 (and execute software programs, such as illustrated example program(s) 157 on computing device(s) 155), but with those details about hardware components and particular executing software programs being omitted for the sake of brevity.

One or more other earth-moving vehicles 170-x/175-x may similarly be present (e.g., on the same job site as earth-moving vehicle 170-1/175-1) and include some or all such components 210-270 and/or 105-149 (although not illustrated here for the sake of brevity) and have corresponding autonomous operations controlled by the EMVOTC system 140 (e.g., with the EMVOTC system operating on a single earth-moving vehicle and communicating with the other earth-moving vehicles via wireless communications, with the EMVOTC system executing in a distributed manner on some or all of the earth-moving vehicles, etc.) or by another embodiment of the EMVOTC system (e.g., with each earth-moving vehicle having a separate copy of the EMVOTC system executing on that earth-moving vehicle and optionally operating in coordination with each other, etc.)). The network 195 may be of one or more types (e.g., the Internet, one or more cellular telephone networks, etc.) and in some cases may be implemented or replaced by direct wireless communications between two or more devices (e.g., via Bluetooth; LoRa, or Long Range Radio; etc.). In addition, while the example of FIG. 1A includes various types of data gathered for an earth-moving vehicle and its surrounding environment, other embodiments may similarly gather and use other types of data, whether instead of or in addition to the illustrated types of data, including non-exclusive examples of image data in one or more light spectrums, non-light energy data, location data of types other than from satellite-based navigation systems, depth or distance data to objects, sound data, etc. In addition, in some embodiments and situations, different devices and/or sensors may be used to acquire the same or overlapping types of data (e.g., simultaneously or sequentially), and the EMVOTC system may combine or otherwise use such different types of data, including to determine differential information for a type of data.

It will be appreciated that computing devices, computing systems and other equipment (e.g., earth-moving vehicles) included within FIG. 1A are merely illustrative and are not intended to limit the scope of the present invention. The systems and/or devices may instead each include multiple interacting computing systems or devices, and may be connected to other devices that are not specifically illustrated, including via Bluetooth communication or other direct inter-device communication, through one or more networks such as the Internet, via the Web, or via one or more private networks (e.g., mobile communication networks), etc. More generally, a device or other system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated EMVOTC system 140 may in some embodiments be distributed in various components, some of the described functionality of the EMVOTC system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity and execution/use. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the EMVOTC system 140 executing on computing device(s) 190) and/or data structures (e.g., trained behavioral model(s) 127), such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 1B:
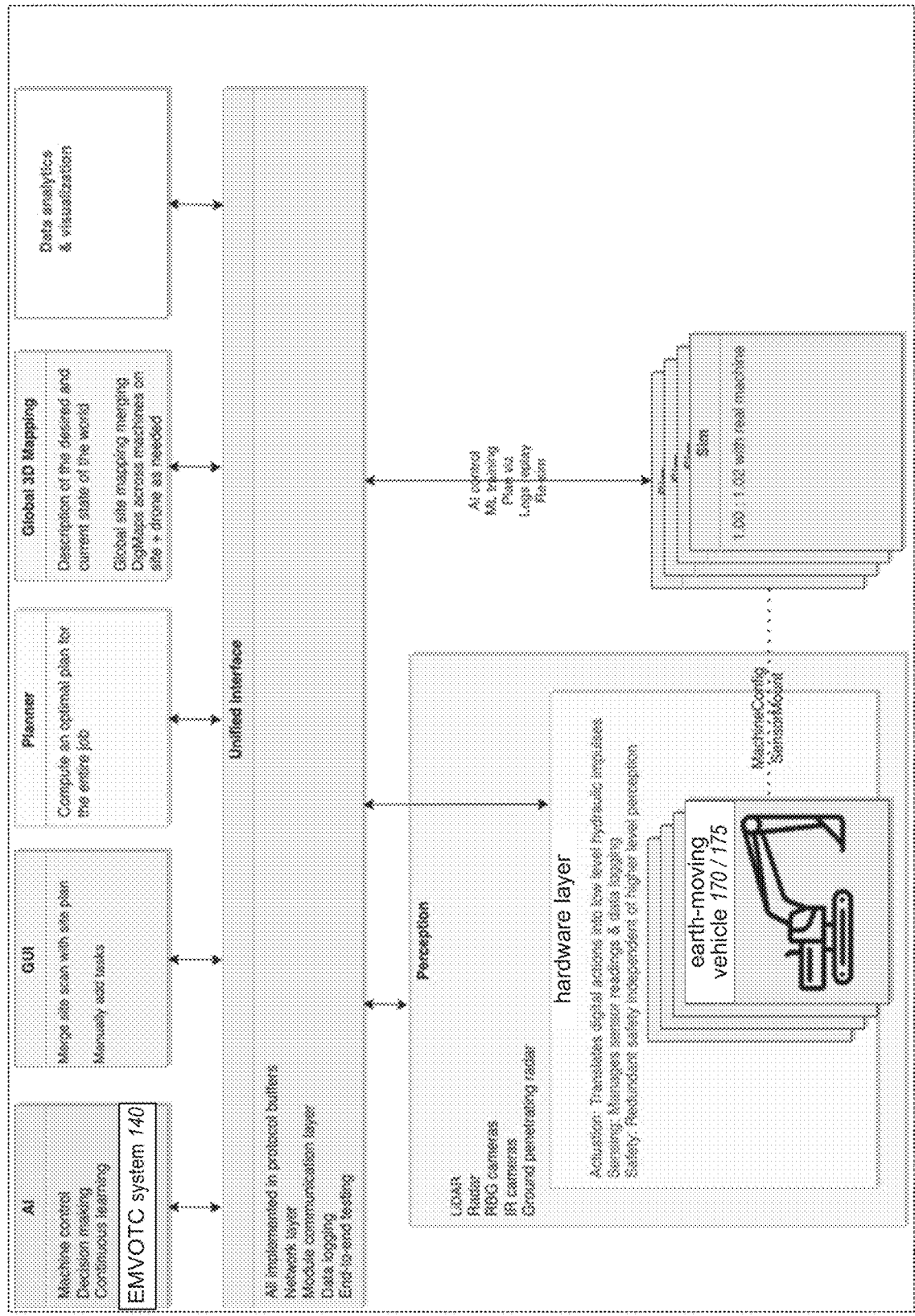
FIG. 1B is a diagram illustrating example components and interactions used to implement autonomous operations of one or more earth-moving vehicles on a site.

FIG. 1B illustrates example components and interactions used to implement autonomous operations of one or more earth-moving vehicles on a site, such as to provide an overview of a software and/or hardware architecture used for performing at least some of the described techniques in at least some embodiments. In particular, FIG. 1B illustrates information 150 that indicates a hardware layer associated with one or more types of earth-moving vehicles 170 (e.g., an excavator vehicle), such as to receive instructions about controlling autonomous operation of the earth-moving vehicle, and to perform actions that include actuation (e.g., translating digital actions into low-level hydraulic impulses), sensing (e.g., to manage sensor readings and data logging), safety (e.g., to perform redundant safety independent of higher-level perception operations), etc. In the illustrated example, the hardware layer interacts with or as part of a perception component, such as to use one or more sensor types to obtain data about the earth-moving vehicle and/or its environment (e.g., LiDAR data, radar data, visual data from one or more RGB camera devices, infrared data from one or more IR sensors, ground-penetrating radar data, etc.). The perception component and/or hardware layer may further interact with a unified interface that connects various components, such as to operate a network layer and to be implemented in protocol buffers as part of providing a component communication layer, as well as to perform data logging, end-to-end testing, etc. In the illustrated example, the unified interface further interacts with an AI (artificial intelligence) component, a GUI component, a Planner component, a Global 3D Mapping component, one or more Sim simulation components, and one or more other components to perform data analytics and visualization. In this example, the AI component includes the EMVOTC system 140, and provides functionality corresponding to machine control, decision-making, continuous learning, etc. The GUI component perform activities that include manually receiving information to add tasks to be performed, to merge a site scan with a site plan, etc. The Planner component performs operations that may include computing an optimal plan for an entire job (e.g., with various tasks to be performed in sequence and/or serially), and the Global 3D Mapping component performs activities that may include providing a description of a current state and/or desired state of an environment around the earth-moving vehicle(s), performing global site mapping merging (e.g., using DigMaps across earth-moving vehicles on the site and optionally drones), etc. The one or more Sim components perform simulations to provide simulated operational data for the one or more earth-moving vehicles, such as for use in AI control, machine learning neural network training (e.g., for one or more behavioral models), replaying logs, planning visualizations, etc. it will be appreciated that the EMVOTC system may be implemented in other architectures and environments in other embodiments, and that the details of FIG. 1B are provided for illustrative purposes.

FIGS. 2A-2I illustrate examples of earth-moving vehicles having multiple types of on-vehicle data sensors positioned to support autonomous operations on a site.

Figure 2A:
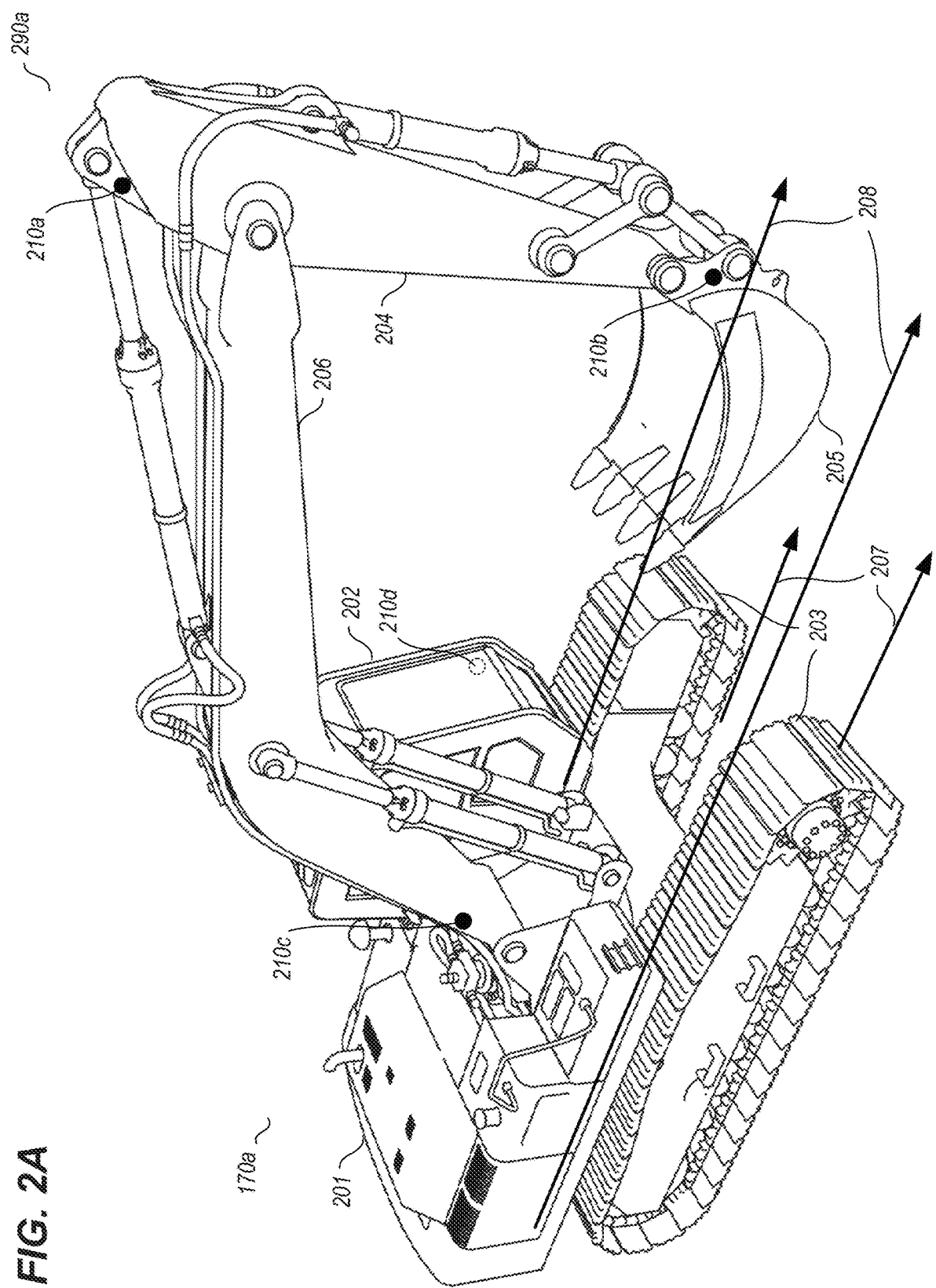

In particular, with respect to FIG. 2A, information 290a about an example excavator vehicle 170a is illustrated using an upper-side-frontal view from the side of the digging boom 206 and arm (or 'stick') 204 and opposite the side of the cabin 202, with the excavator vehicle further having a main body chassis 201 (e.g., enclosing an engine and counterweight, and including the cabin 202), tracks 203 and bucket (or 'scoop' or 'claw') attachment 205—in other embodiments, digging arm attachments other than a bucket may be used such as, for example, a hydraulic thumb, coupler, breaker, compactor, digging bucket, grading bucket, hammer, demolition grapple, tiltrotator, etc. Four example inclinometers 210 are further illustrated at positions that beneficially provide inclinometer data to compute the location of the bucket and other parts of the digging boom/arm relative to the cabin of the excavator vehicle. In this example, three inclinometers 210a-210c are mounted at respective positions on the digging boom/arm of the excavator vehicle (position 210c near the intersection of the digging boom and the body of the excavator vehicle, position 210b near the intersection of the digging arm and the bucket attachment, and position 210a near the intersection of the digging boom and arm), such as to use single-axis inclinometers in this example, and with a fourth inclinometer 210d mounted within the cabin of the excavator vehicle and illustrated at an approximate position using a dashed line, such as to use a dual-axis inclinometer that measures pitch and roll—data from the inclinometers may be used, for example, to track the position of the excavator boom/arm/attachment, including when a track heading direction 207 is determined to be different from a cabin/body heading direction 208 (not shown in this example). It will be appreciated that other quantities, positionings and types of inclinometers may be used in other embodiments.

Figure 2B:
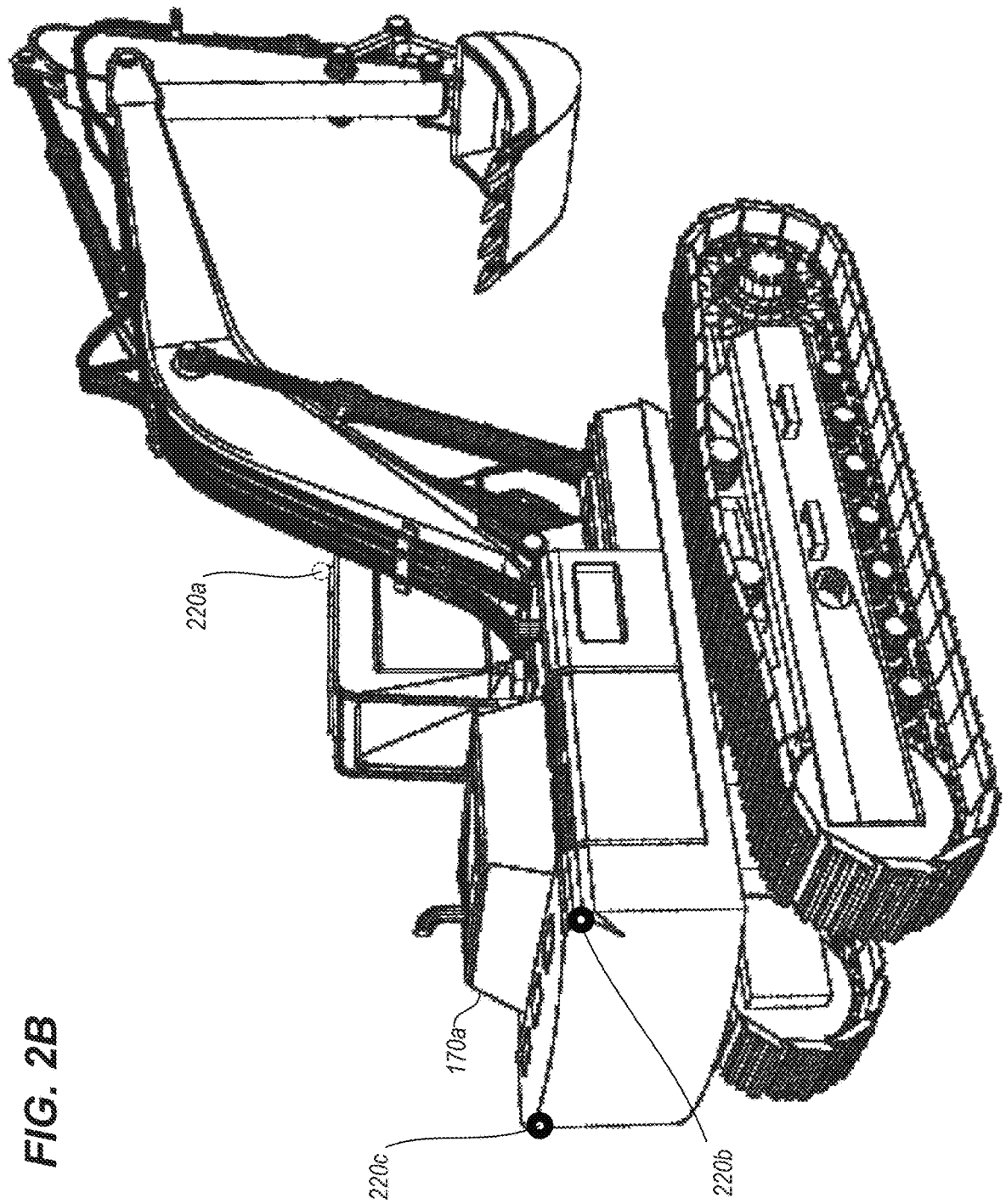
Figure 2C:
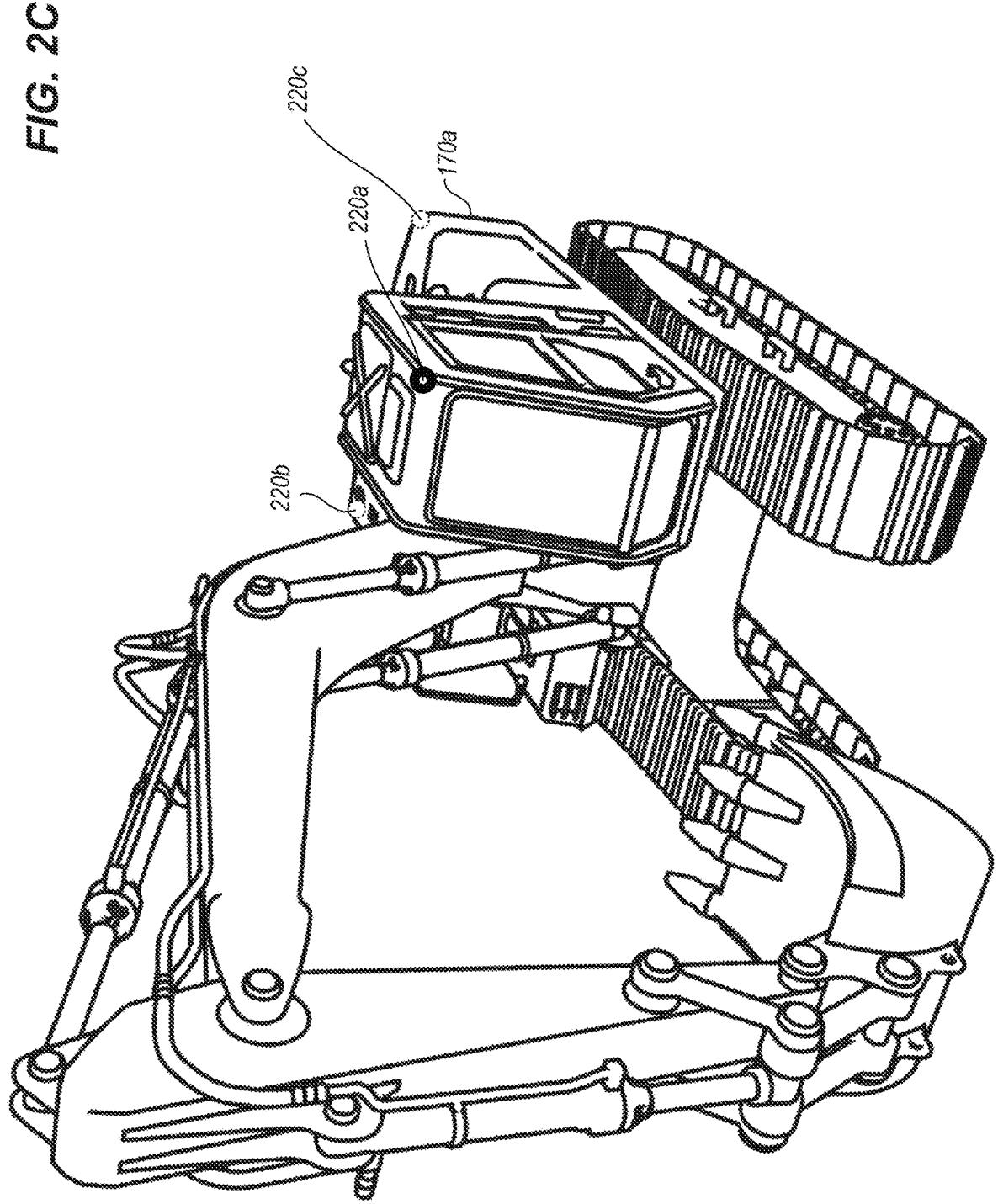

FIGS. 2B and 2C continue the example of FIG. 2A, and illustrate information 290b and 290c respectively showing three example GPS antennas 220 at positions that beneficially provide GPS data to assist in determining the positioning and direction of the cabin/body, including to use data from the three GPS antennas to provide greater precision than is available from a single GPS antenna. In this example, the three GPS antennas 220a-220c are positioned on the excavator body chassis and proximate to three corners of the chassis (e.g., as far apart from each other as possible), such that differential information between GPS antennas 220a and 220c may provide cabin heading direction information, and differential information between GPS antennas 220b and 220c may provide lateral direction information at approximately 90° from that cabin heading direction information. In particular, in FIG. 2B, the example excavator vehicle 170a is shown using a side-rear view from the side of the boom/arm, with GPS antennas 220b and 220c illustrated on the back of the body chassis at or below the top of that portion of the body chassis, and with an approximate position of GPS antenna 220a on the cabin top near the front illustrated with dashed lines (e.g., as illustrated further in FIG. 2C). In FIG. 2C, the example excavator vehicle 170a is shown using an upper-side-frontal view from the side of the cabin, with GPS antenna 220a shown on the cabin top near the front on the same side as GPS antenna 220c, and with the positions of GPS antennas 220b and 220c illustrated through the body chassis with dashed lines (e.g., just below the top of the back of the body chassis, as illustrated in FIG. 2B). While not illustrated in FIGS. 2B-2C, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the excavator vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) may be used in other embodiments.

Figure 2D:
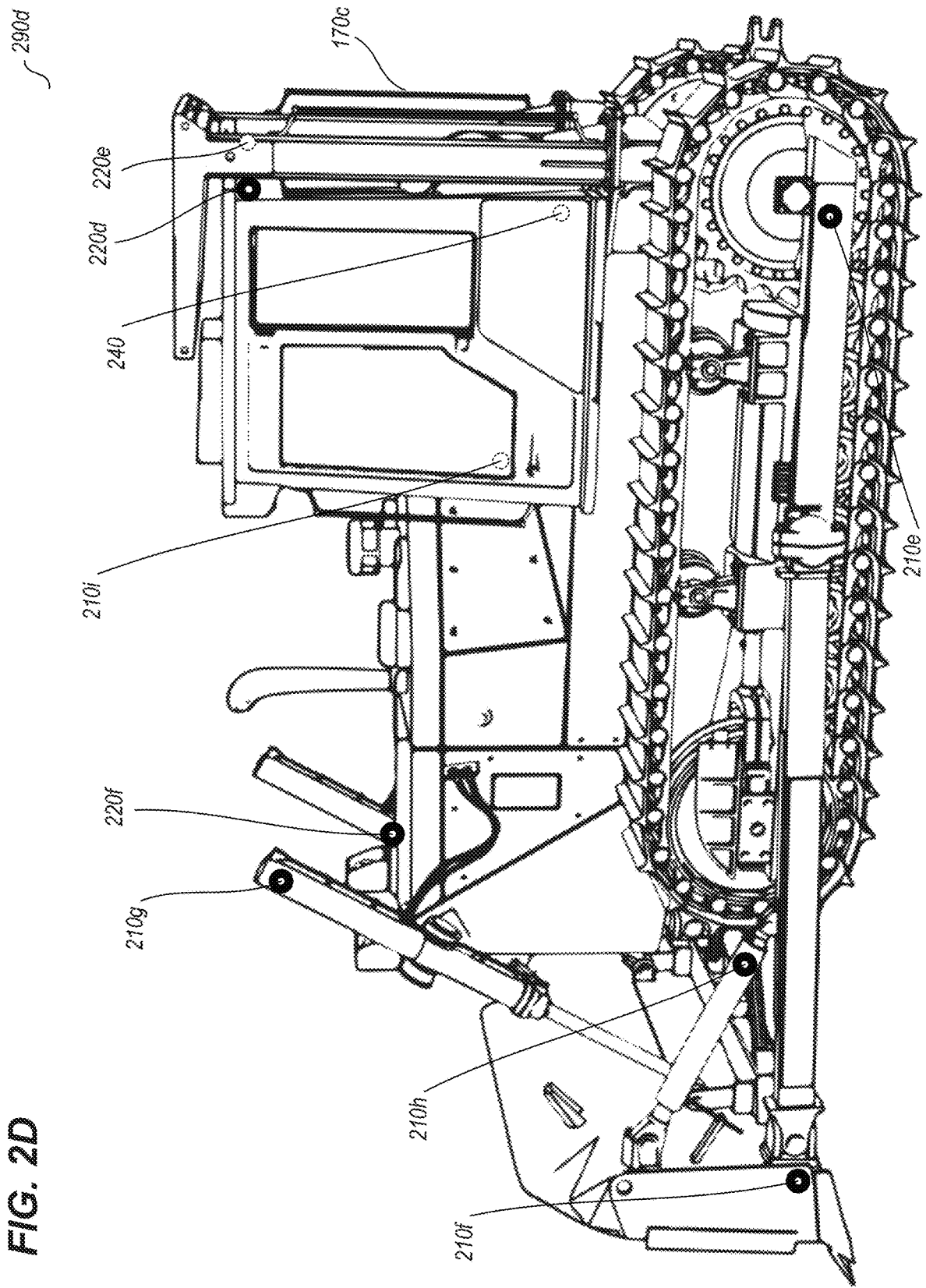
Figure 2F:
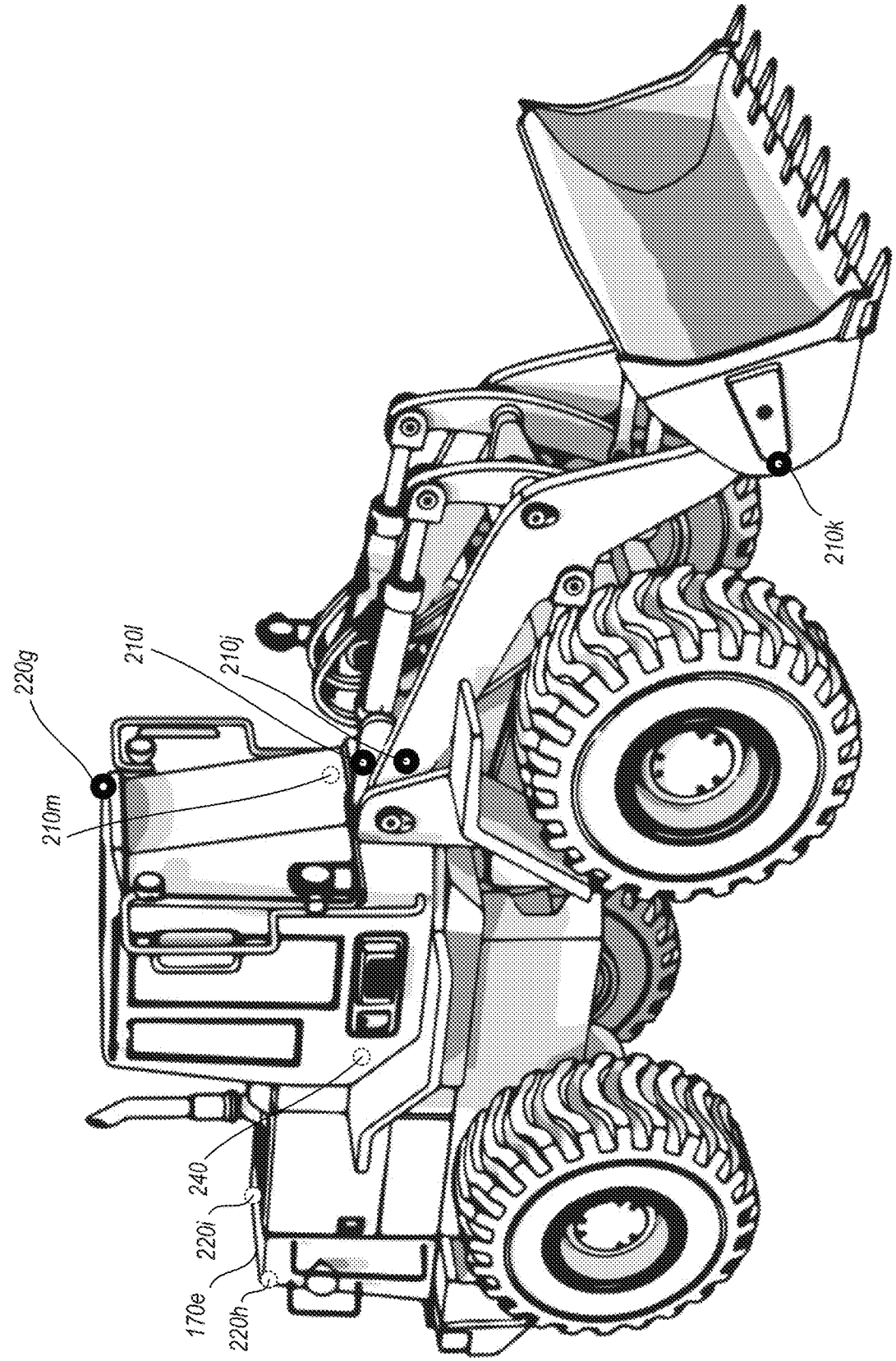
Figure 2G:
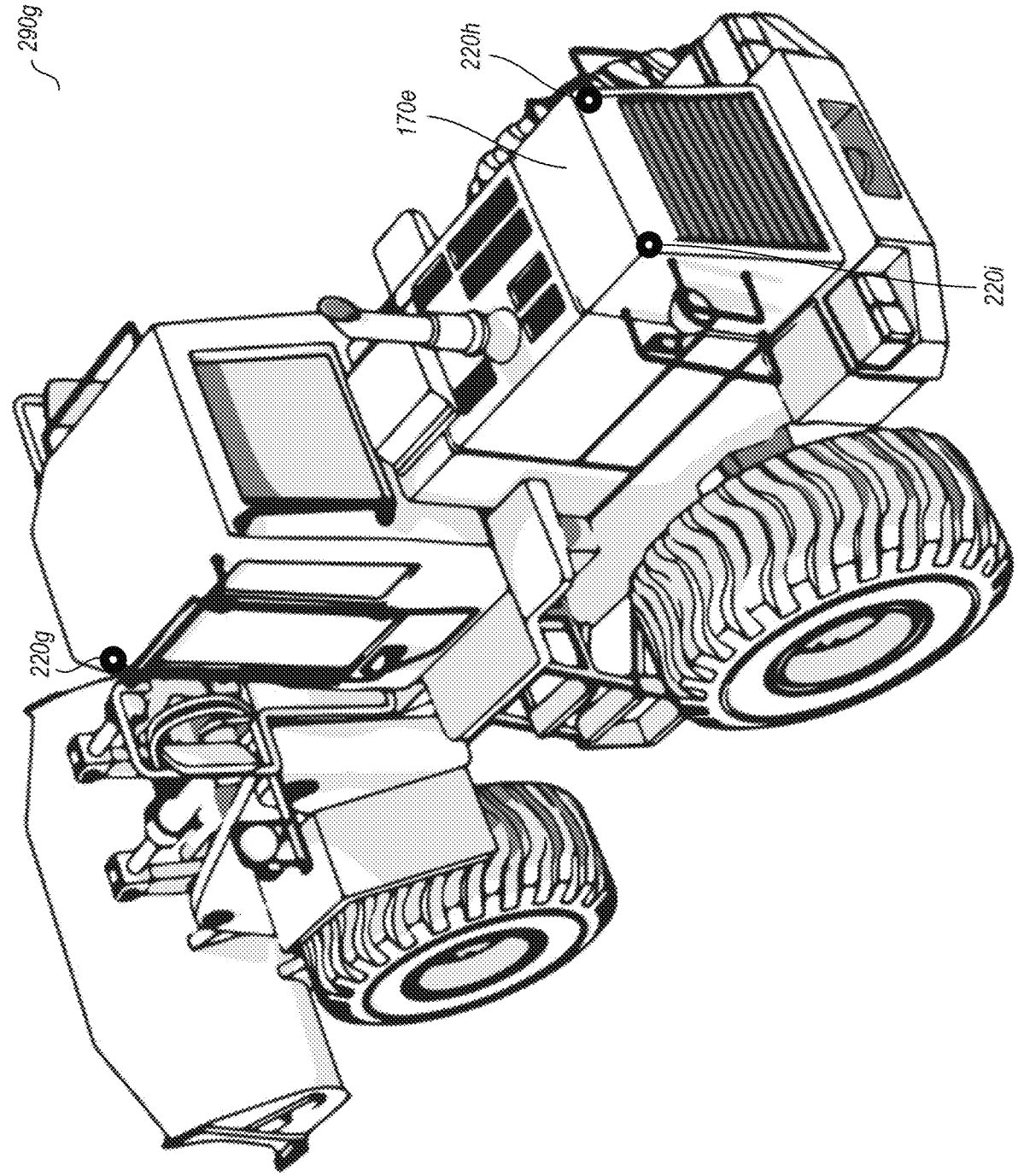
Figure 2H:
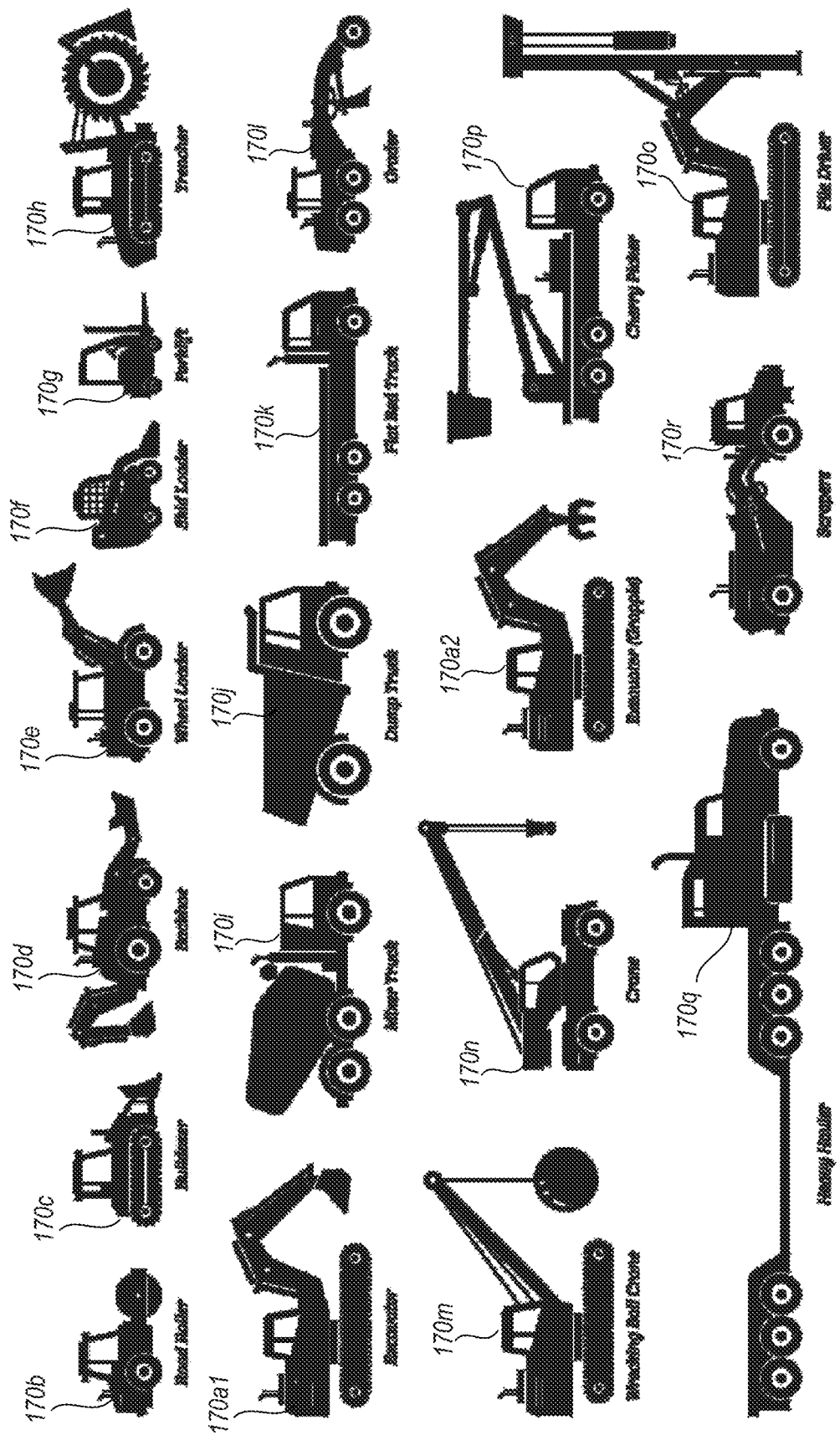
Figure 2I:
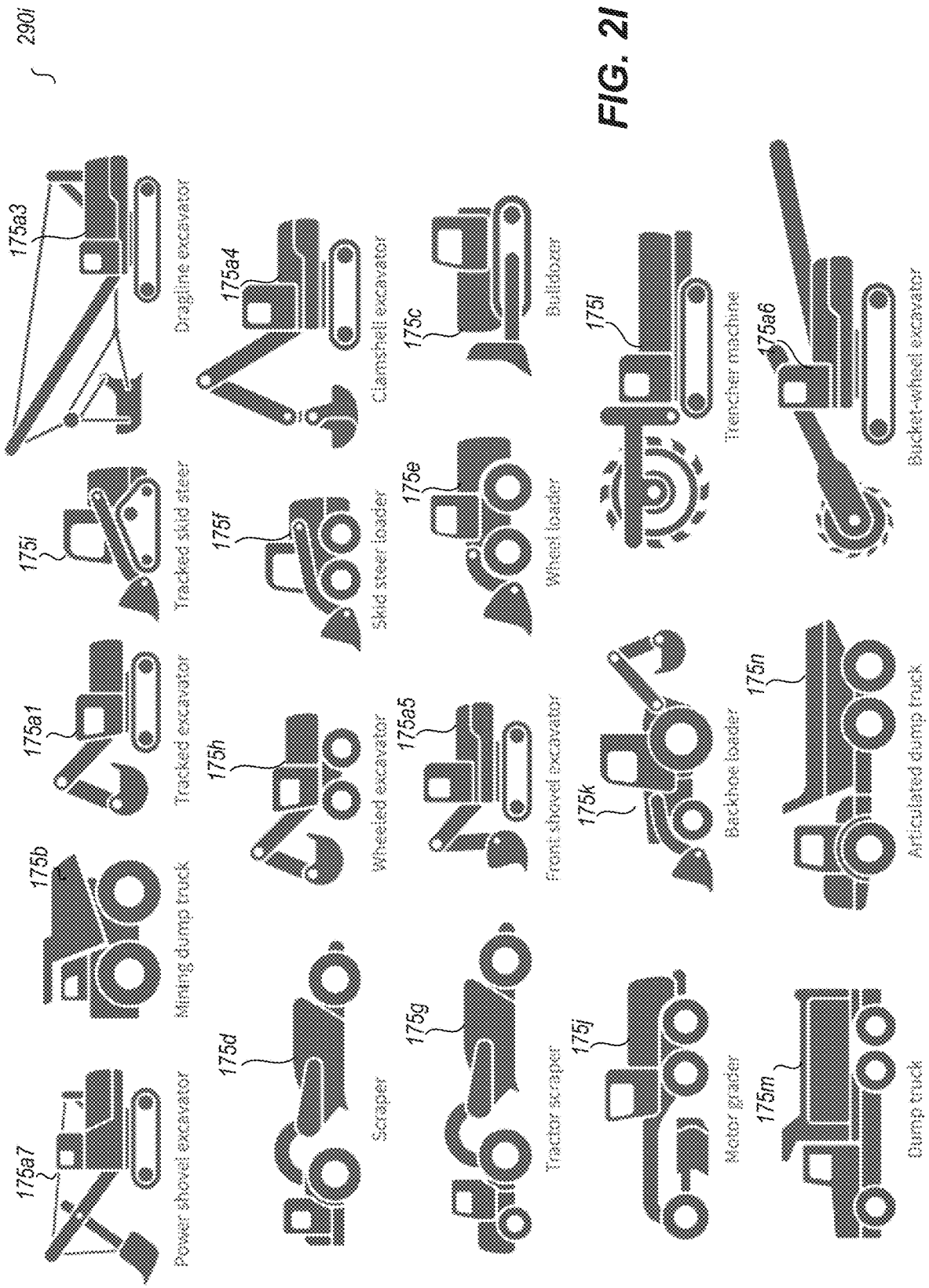

FIGS. 2D-2I continue the examples of FIGS. 2A-2C, with FIG. 2H illustrating information 290h about a variety of example types of earth-moving construction vehicles that may be controlled by embodiments of the EMVOTC system, and FIG. 2I illustrating information 290i about a variety of example types of earth-moving mining vehicles that may be controlled by embodiments of the EMVOTC system. The example earth-moving construction vehicles of FIG. 2H include two example excavator vehicles 170a shown with different attachments (excavator vehicle 170a1 with a bucket attachment, and excavator vehicle 170a2 with a grapple attachment), and other example types of earth-moving construction vehicles that are illustrated include a bulldozer 170c; a backhoe loader 170d; a wheel loader 170e; a skid steer loader 170f; a dump truck 170j; a forklift 170g; a trencher 170h; a mixer truck 170i; a flatbed truck 170k; a grader 170l; a wrecking ball crane 170m; a truck crane 170n; a cherry picker 170p; a heavy hauler 170q; a scraper 170r; a pile driver 170o; a road roller 170b; etc. It will be appreciated that other types of earth-moving vehicles may similarly be controlled by the EMVOTC system in other embodiments. In addition, the example earth-moving mining vehicles of FIG. 2I include several example earth-moving tracked mining excavator vehicles 175a shown with different attachments (excavator vehicle 175a1 with a bucket attachment, excavator vehicle 175a3 with a dragline attachment, excavator vehicle 175a4 with a clamshell extractor attachment, excavator vehicle 175a5 with a front shovel attachment, excavator vehicle 175a6 with a bucket wheel extractor attachment, excavator vehicle 175a7 with a power shovel attachment, etc.), and other example types of earth-moving mining vehicles 175 that are illustrated include a dump truck 175m; an articulated dump truck 175n; a mining dump truck 175b; a bulldozer 175c; a scraper 175d; a tractor scraper 175g; a wheel loader 175e; a wheeled skid steer loader 175f; a tracked skid steer loader 175i; a wheeled excavator 175h; a backhoe loader 175k; a motor grader 175j; a trencher 175l; etc. It will be appreciated that other types of earth-moving mining vehicles may similarly be controlled by embodiments of the MOTC system, as discussed elsewhere herein.

FIGS. 2D and 2E illustrate further example details about a bulldozer earth-moving vehicle 170c, such as to illustrate example positions for GPS receivers 220 and/or inclinometers 210. In particular, FIG. 2D illustrates example information 290d that includes various example inclinometers 210e-210i, and example GPS antennas/receivers 220d-220f. The example inclinometers 210e-210i are further illustrated at positions that beneficially provide inclinometer data to compute the location of the blade or other front attachment (and optionally other parts of the bulldozer, such as the hydraulic arms) relative to the cabin of the bulldozer vehicle (e.g., at position 210e near the intersection of the track spring lifting arm and the body of the vehicle, position 210f near the intersection of the track spring lifting arm and the blade or other attachment, position 210g at one end of a hydraulic arm, position 210h at one end of the tilt cylinder, etc.), such as to use single-axis inclinometers in this example, and with another inclinometer 210i mounted within the cabin of the vehicle and illustrated at an approximate position using a dashed line, such as to use a dual-axis inclinometer that measures pitch and roll—data from the inclinometers may be used, for example, to track the position of the track spring lifting arm and attachment relative to the cabin/body of the vehicle. The example GPS antennas/receivers 220 are further illustrated at positions that beneficially provide GPS data to assist in determining the positioning and direction of the cabin/body, including to use data from the three GPS antennas to provide greater precision than is available from a single GPS antenna. In this example, the three GPS antennas 220d-220f are positioned on the body chassis and proximate to three corners of the chassis (e.g., as far apart from each other as possible), such that differential information between GPS antennas 220f and 220e may provide cabin heading direction information, and differential information between GPS antennas 220d and 220e may provide lateral direction information at approximately 90° from that cabin heading direction information. In particular, in FIG. 2D, the example vehicle 170c is shown using a side view, with GPS antennas 220d and 220e illustrated on the back of the body chassis at or below the top of that portion of the body chassis (using dashed lines to illustrate position 220e), and with an approximate position of GPS antenna 220f on the chassis top near the front—the positions 220d-220f are further illustrated in information 290e of FIG. 2E. In FIG. 2E, the example vehicle 170c is shown using an upper-side-back view, with GPS antenna 220f shown on the body top near the front on the same side as GPS antenna 220e. While not illustrated in FIGS. 2D-2E, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors may be used in other embodiments.

FIGS. 2F and 2G illustrate further example details about a wheel loader earth-moving vehicle 170e, such as to illustrate example positions for GPS receivers 220 and/or inclinometers 210. In particular, FIG. 2F illustrates example information 290f that includes various example inclinometers 210j-210m, and example GPS antennas/receivers 220g-220i. The example inclinometers 210j-210m are further illustrated at positions that beneficially provide inclinometer data to compute the location of the bucket or other front attachment (and optionally other parts of the wheel loader, such as the hydraulic arms) relative to the cabin of the loader vehicle (e.g., at position 210j near the intersection of the boom lifting arm and the body of the vehicle, position 210k near the intersection of the boom lifting arm and the bucket or other attachment, position 210l at one end of a hydraulic arm, etc.), such as to use single-axis inclinometers in this example, and with another inclinometer 210m mounted within the cabin of the vehicle and illustrated at an approximate position using a dashed line, such as to use a dual-axis inclinometer that measures pitch and roll—data from the inclinometers may be used, for example, to track the position of the boom lifting arm and attachment relative to the cabin/body of the vehicle. The example GPS antennas/receivers 220 are further illustrated at positions that beneficially provide GPS data to assist in determining the positioning and direction of the cabin/body, including to use data from the three GPS antennas to provide greater precision than is available from a single GPS antenna. In this example, the three GPS antennas 220g-220i are positioned on the body chassis and proximate to three corners of the chassis (e.g., as far apart from each other as possible), such that differential information between GPS antennas 220g and 220i may provide cabin heading direction information, and differential information between GPS antennas 220h and 220i may provide lateral direction information at approximately 90° from that cabin heading direction information. In particular, in FIG. 2F, the example vehicle 170e is shown using a side-frontal view, with GPS antennas 220h and 220i illustrated on the back of the body chassis at or below the top of that portion of the body chassis (using dashed lines to illustrate their positions), and with an approximate position of GPS antenna 220g on the chassis top near the front—the positions 220g-220i are further illustrated in information 290g of FIG. 2G. In FIG. 2G, the example vehicle 170e is shown using an upper-side-back view, with GPS antenna 220g shown on the body top near the front on the same side as GPS antenna 220i. While not illustrated in FIGS. 2F and 2G, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors may be used in other embodiments.

Figure 2J:
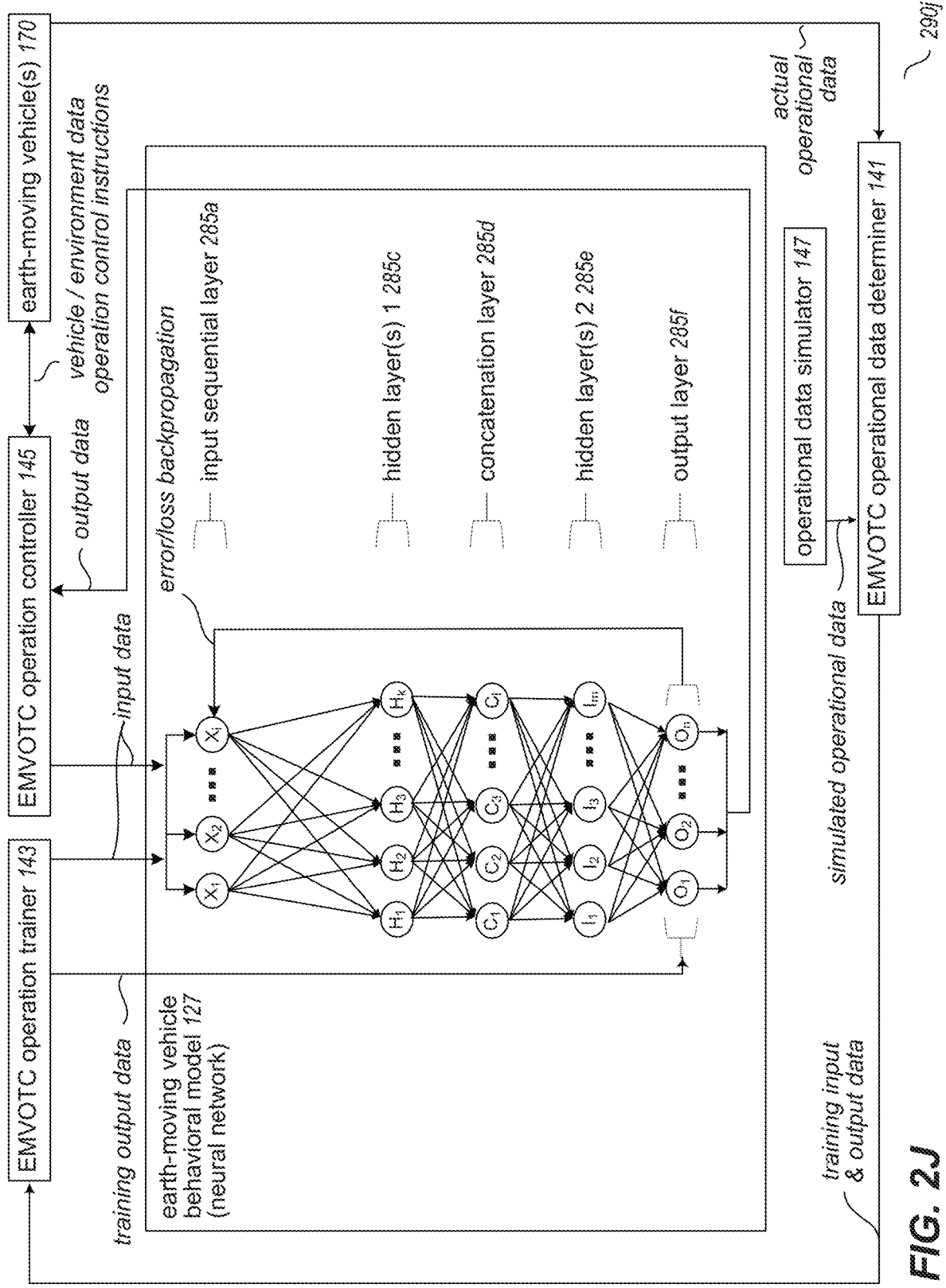
FIG. 2J illustrates an example of components and interactions used in training a behavioral machine learning model to implement autonomous operations of one or more earth-moving vehicles on a site.

FIG. 2J illustrates an example of components and interactions used in training a behavioral model to implement autonomous operations of one or more earth-moving vehicles. In particular, FIG. 2J illustrates information 290j about an earth-moving vehicle behavioral model 127 that is implemented in this example embodiment as a neural network with multiple layers 285, including input sequential layer 285a, one or more first hidden layers 285c, a concatenation layer 285d, one or more additional hidden layers 285e, and an output layer 285f. In this example, an EMVOTC operational data determiner component 141 receives actual operational data from actual operation of one or more earth-moving vehicles 170 (e.g., one or more excavator vehicles 170a) by one or more human operators and simulated operational data from one or more operational data simulator components 147, and supplies corresponding training at the output data to an EMVOTC operation trainer component 143. The component 143 uses the training data to supply training input and output data to the behavioral model 127 in order to train the model, including to use the training data to generate and perform error/loss backpropagation to improve the operation of the model. Once the behavioral model is sufficiently trained, an EMVOTC operation controller component 145 may use the trained behavioral model to control autonomous operations of one or more of the earth-moving vehicle(s) 170, such as to supply input data to the behavioral model 127 corresponding to a current state and environment of the earth-moving vehicle(s) (e.g., received from the earth-moving vehicle(s) and/or one or more other sources, not shown) and about one or more tasks be performed (e.g., from a planner component or other source, not shown), and to receive corresponding output data that the component 145 uses to provide operation control instructions to the earth-moving vehicle(s) 170. As one non-exclusive example, the operation control instructions may simulate inputs to the control panel on an earth-moving vehicle that would be used by a human operator, if one were present—for example, a command may represent joystick deflection (e.g., for one or both of two joysticks, each with 2 axes), activation of a tool control button on one of the joysticks for controlling the tool attachment (e.g., claw, bucket, hammer, etc.), pedal position (e.g., for one or both of two pedals, analogous to car pedals but with a zero position in the middle and with the pedal able to move forward or backward), etc., such as using a number between −1 and 1. In some embodiments, behavioral models may be further refined and/or fine-tuned via data generated from the feedback loops via an operational data simulator component and actual physical machines according to one or more optimization criteria, such as one or more of operational speed, digging performance (e.g., volumes), operational safety, machine safety (e.g., health), etc. Such a reinforcement loop may, for example, generate further data for the behavioral machine learning models, such as to focus on creating new training episodes in which the behavioral models have less certainty on the state of the environment or the outcome of results of the action that will be taken by the behavioral models. A combination of actual operational data from human operators with various skill levels and simulated operational data provides for reinforcement learning at a large scale to achieve superior performance and safety of the behavioral model. In one embodiment, the behavioral model achieves at least 17% efficiency improvement and 20× duty cycle improvement over human operators. Further, such described techniques may be used in some embodiments to enhance the performance of human operators who, for example, may optionally remain in the cabin of an earth-moving vehicle being controlled by the EMVOTC system to monitor the autonomous control (e.g., to monitor aspects of production) or may otherwise be in a position to perform such monitoring (e.g., from a remote location).

Figure 2K:
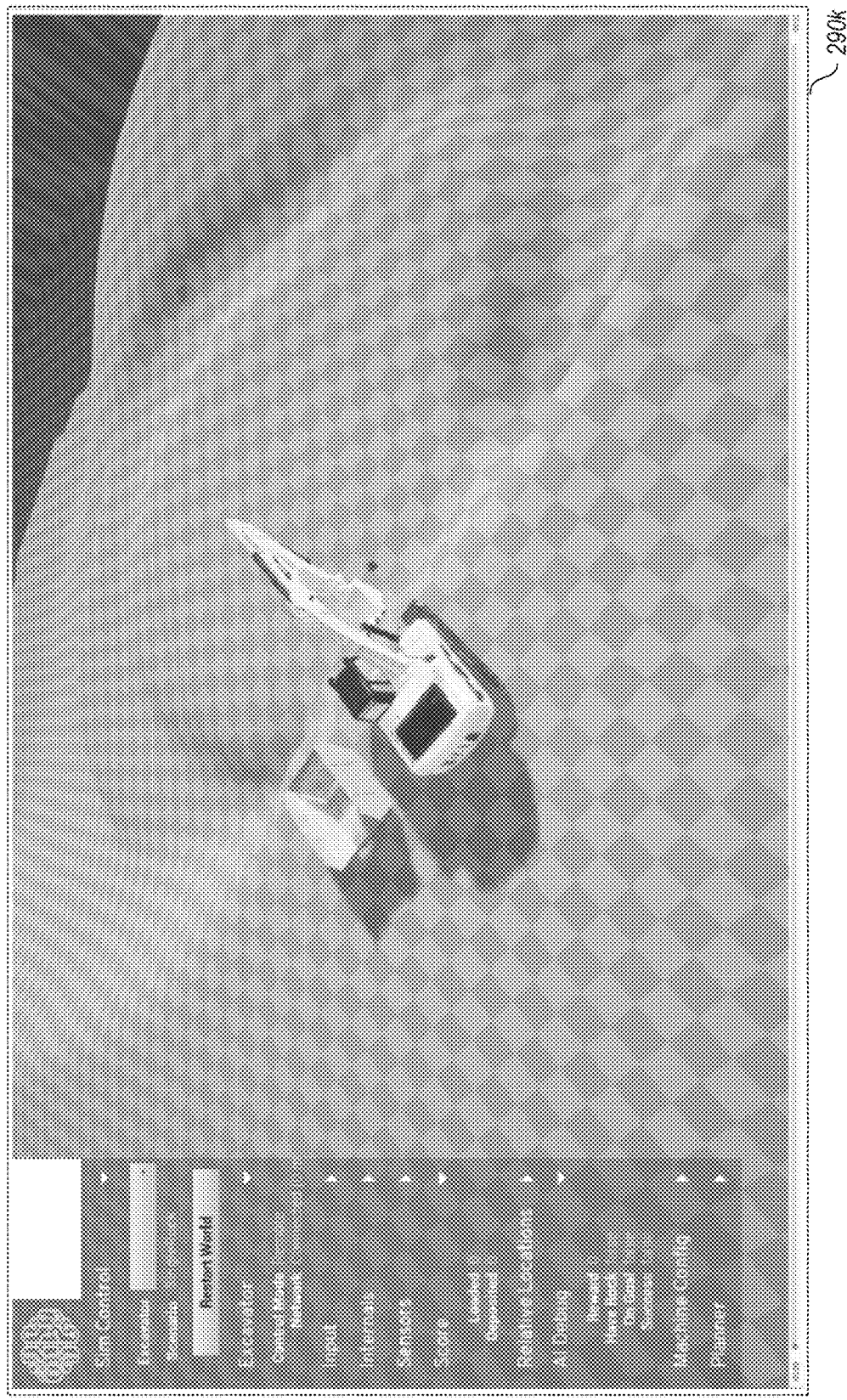
Figure 2L:
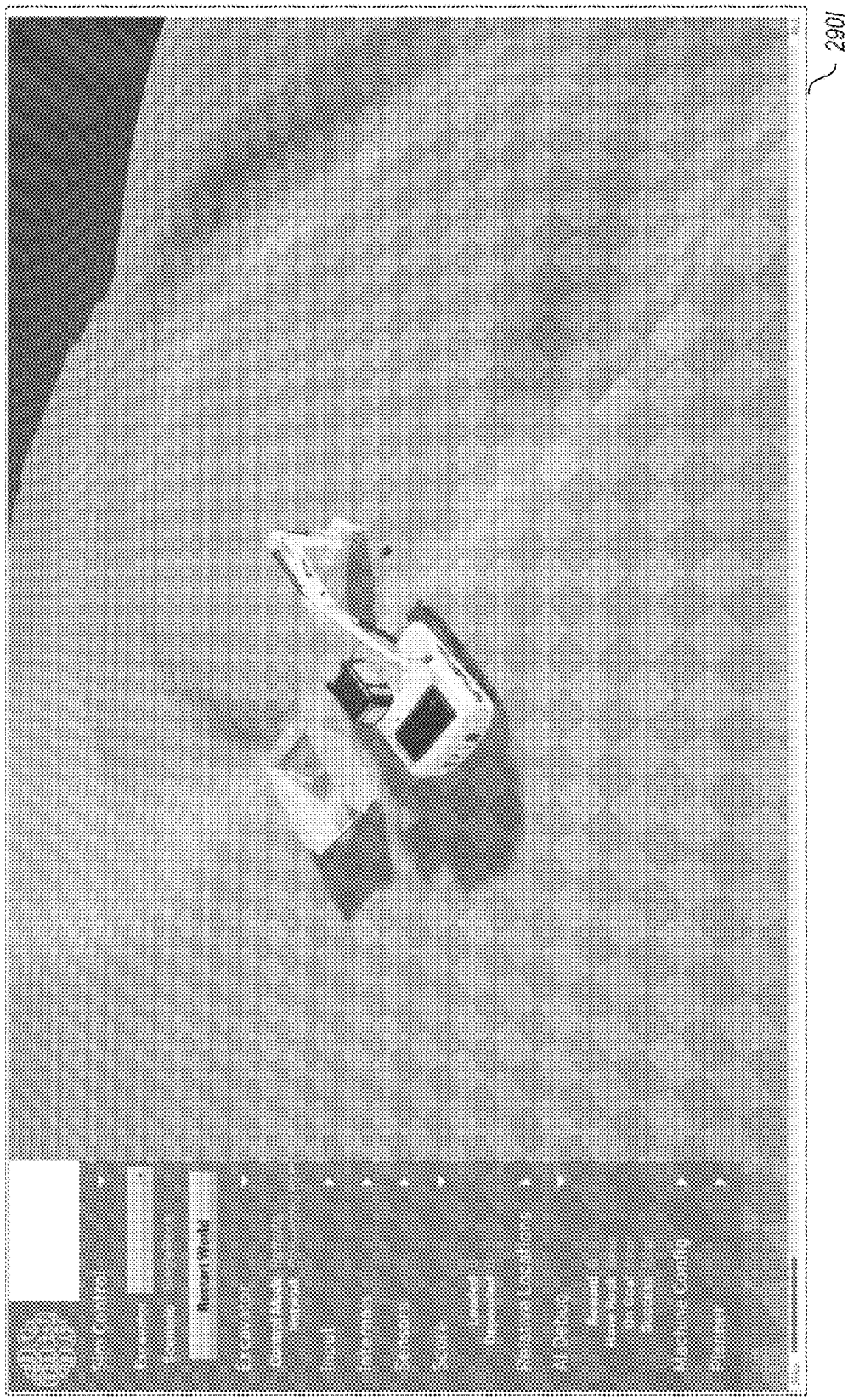
Figure 2M:
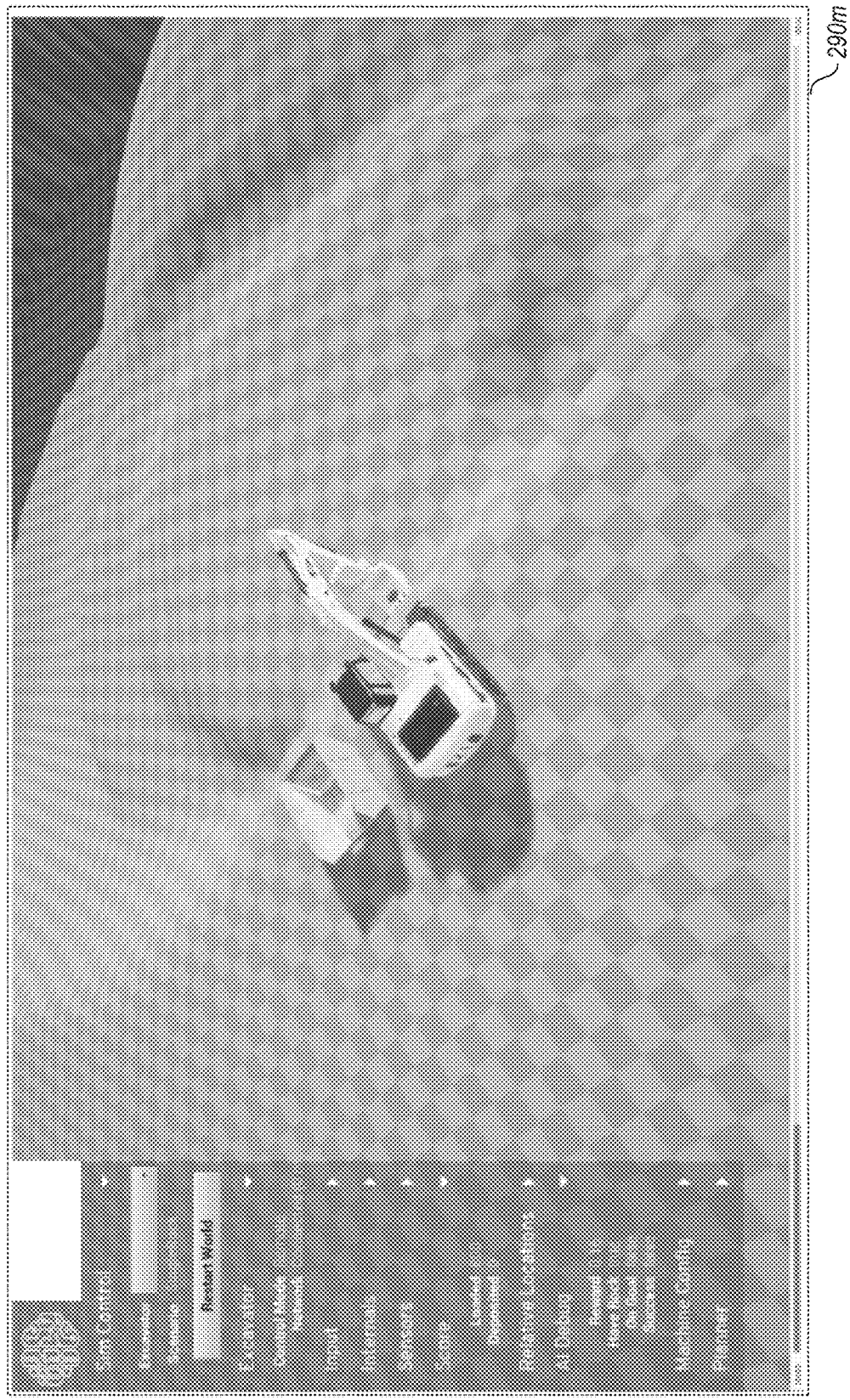
Figure 2N:
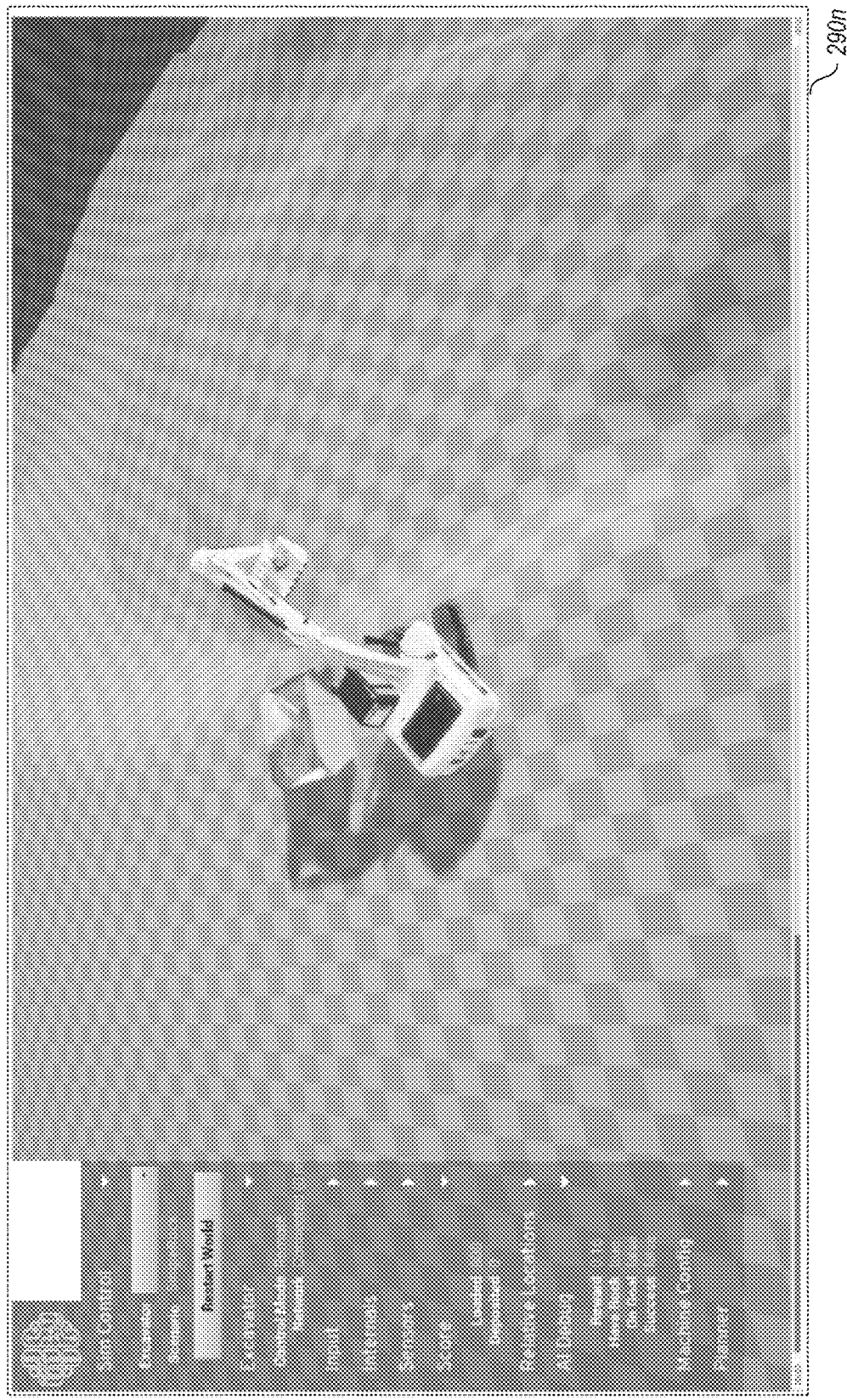
Figure 2P:
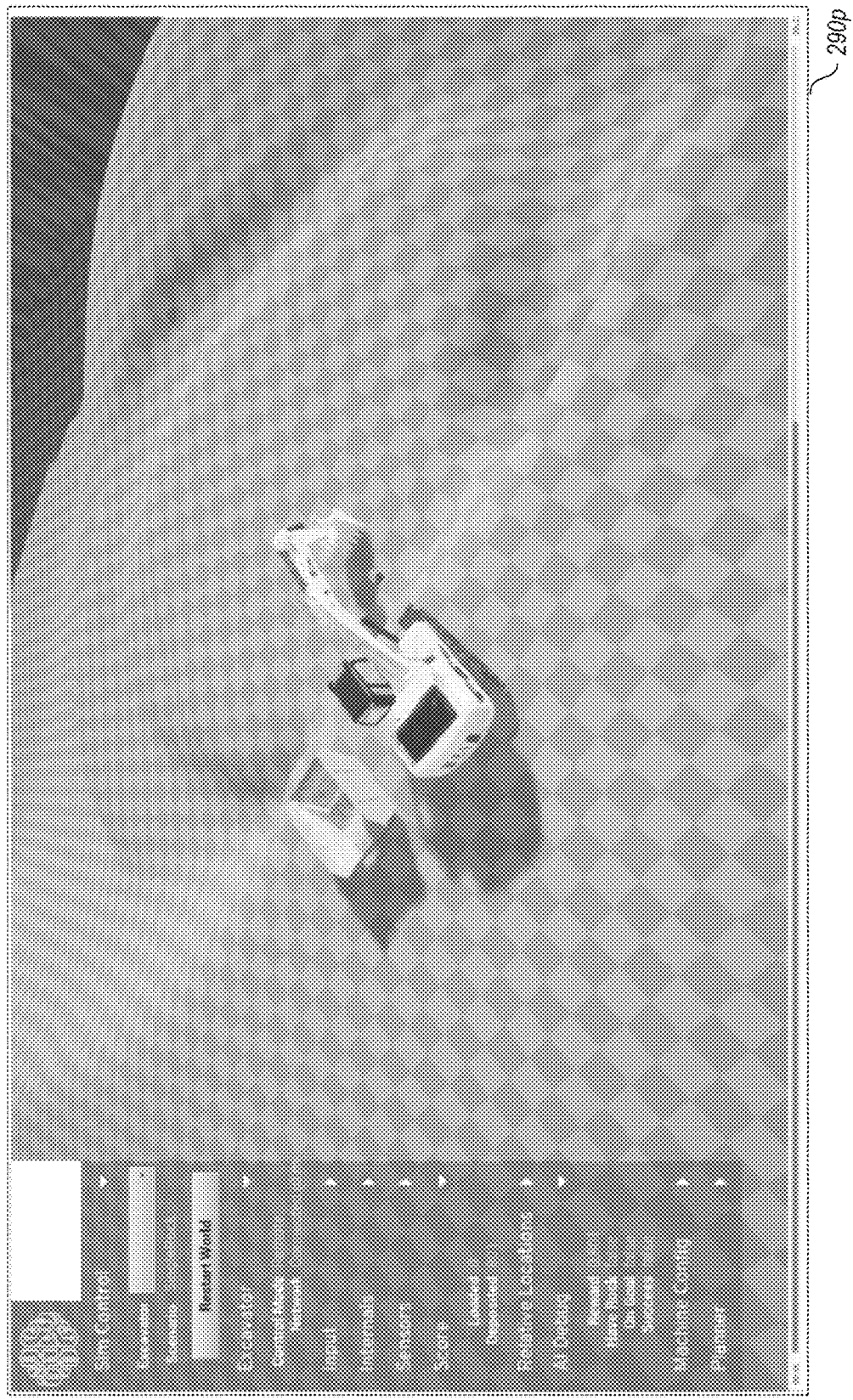

FIGS. 2K-2P illustrate examples of performing simulations of operations of an earth-moving vehicle on a site and of gathering various corresponding simulation data (as discussed further with respect to FIG. 2Q). In particular, FIG. 2K illustrates information 290k for a GUI of a simulation component that in the illustrated example is configured to repeatedly simulate operations of an excavator vehicle in performing a task that includes picking up a rock in a hole in front of the excavator vehicle and moving it to a goal location outside of the hole (e.g., a receptacle to the side of the excavator vehicle). The illustrated GUI includes various controls and information, such as to track the simulated activities of the excavator vehicle as it performs the task. FIGS. 2L-2O illustrate further examples of information in the GUI as the simulated component performs a simulation of an episode of retrieving and moving the rock, illustrating information 290l-290o, respectively—FIG. 2O is referred to herein as '2-O' to prevent confusion with the number '20'. FIG. 2L illustrates an example of moving the boom/arm/bucket forward to a position that will allow retrieval of the rock, FIGS. 2M-2-O illustrate, for example, that a 'Have Rock' state is changed to true once the rock has been successfully scooped up by the bucket of the excavator vehicle, and FIG. 2-O further illustrates that a 'On Goal' state is changed to true once the rock is located above the receptacle (once the rock is dropped or otherwise placed into the receptacle, not shown here, the 'Success' state will further be turned to true). FIG. 2P illustrates an example of beginning a next episode to perform the same task (with the 'Have Rock', 'On Goal' and 'Success' states return to false but with Reward information being updated to indicate the successful performance of the task in the previous episode), but with the initial conditions varied, such as by having the initial rock placement in FIG. 2P being different than that of FIG. 2K, and with the initial placement of the bucket being further to the right (when facing forward from the cabin) than that of FIG. 2L. It will be appreciated that such simulation activities may be performed for very large numbers of simulated episodes (e.g., hundreds, thousands, millions, etc.), and that a variety of other changes may be made to the simulation techniques in other embodiments. FIG. 2Q illustrates one example of a format for recording actual and/or simulated operational data for use in training a behavioral model. In particular, FIG. 2Q illustrates a table 275 that includes various rows 275a-275l illustrating excavator vehicle data at different time points (e.g., sampled every millisecond, every 10 ms, every 20 ms, every 30 ms, every 40 ms, every 50 ms, every 100 ms, every 200 ms, every second, etc.), and with various columns to illustrate recorded actual operational data or simulated operational data for each of the time points (e.g., for the first row in an episode to reflect state of the excavator vehicle and a target destination location for a task for the episode). In this example, the columns are as follows: the first three columns 'tilt_x', 'tilt_y' and 'tilt_z' illustrate positions of a point on the excavator vehicle (e.g., on the main body chassis, or the boom, or the arm, or the bucket or other attachment) at that time point and the next three columns 'angles_x', 'angles_y' and 'angles_z' represent an angular measurement of at least one of the boom relative to the main body chassis, or the arm relative to the boom, or the bucket (or other attachment) relative to the arm and/or boom, such as with the angular measurements determined for the actual operational data using inclinometer data and the position measurements determined for the actual operational data using an RTK-enabled GPS positioning unit; the next three columns 'bucket_x', 'bucket_y' and 'bucket_z' illustrate positions of a point on the bucket (or other attachment) of the excavator vehicle at that time point (e.g., the middle tip of the bucket), such as are determined for the actual operational data using an RTK-enabled GPS positioning unit and/or inclinometer data; the next three columns 'target_vec', 'target_vec' and 'target_vec' (shown in a separate area below the prior columns to enable the additional columns to be shown on a single page) illustrate information about one or more vectors to a target destination location (e.g., a target object or area) at that time point from one or more points of the excavator vehicle (e.g., the end of the bucket, the end of the arm/stick, etc.), such as may be determined based on the difference between the target destination location and a current position of the corresponding excavator vehicle point(s); the next two columns 'have_rock' and 'on_goal' illustrate information about status of task completion at that time point (e.g., in a manner similar to that discussed with respect to FIGS. 2K-2P); and the last three columns 'stick_end_xyz', 'stick_end_xyz' and 'stick_end_xyz' illustrate information about a position on the arm/stick (e.g., at the end of the arm/stick) at that time point, such as are determined for the actual operational data using an RTK-enabled GPS positioning unit and/or inclinometer data. The illustrated example rows are a small subset of the actual data for a single episode of performing a task, with rows 275g and onward in this example corresponding to a state at which the excavator vehicle has picked up the rock, and rows 275j and onward corresponding to a further state at which the excavator vehicle has moved the rock to a goal area or location. An episode may be defined in various manners in various embodiments (e.g., accomplishing one or more defined tasks, attempting to accomplish one or more defined tasks, operating for a defined period of time, etc.), and success may be defined in various manners in various embodiments, such as successfully picking up one or more rocks or other loads (e.g., without dropping the load), successfully moving one or more picked-up rocks or other loads to a goal location (e.g., without dropping the load), successfully depositing one or more picked-up rocks or other loads at a goal location, successfully reaching another type of defined result (e.g., creating a hole of a defined size and/or shape at a specified position), etc.. In addition, a sliding window used for packing data may be a defined quantity of data (e.g., a defined quantity of rows), and the packing of such data may include concatenating data for each of the rows in a sliding window (e.g., for a sliding window corresponding to three rows, packing data for a first sliding window by storing data of row 1 followed by data of row 2 followed by data of row 3, and then packing data for a second sliding window by storing data of row 2 followed by data of row 3 followed by data of row 4, etc.). It will be appreciated that a variety of other types of data may be recorded and/or simulated in other embodiments, including for other types of earth-moving vehicles and whether in addition to or instead of the illustrated types of data, and with respect to a variety of other types of sensors or other measurements.

Additional details about autonomous control of operations of one or more powered earth-moving vehicles are included in U.S. patent application Ser. No. 17/970,427, entitled "Autonomous Control Of On-Site Movement Of Powered Earth-Moving Construction Or Mining Vehicles" and filed Oct. 20, 2022; in U.S. patent application Ser. No. 17/893,423, entitled "Hardware Component Configuration For Autonomous Control Of Powered Earth-Moving Vehicles" and filed Aug. 23, 2022; in U.S. Provisional Patent Application No. 63/354,677, entitled "Proportional Pressure Control System For Autonomous Control Of Earth-Moving Construction And/Or Mining Vehicles" and filed Jun. 22, 2022; in U.S. Provisional Patent Application No. 63/433,731, entitled "Adaptive Control System For Autonomous Control Of Powered Earth-Moving Vehicles" and filed Dec. 19, 2022; in U.S. Patent Application No. 63/350,149, filed Jun. 8, 2022 and entitled "Autonomous Control Of Operations Of Earth-Moving Vehicles Using Data From Simulated Vehicle Operation", each of which is hereby incorporated by reference in its entirety.

Various details have been provided with respect to FIGS. 2A-2Q, but it will be appreciated that the provided details are non-exclusive examples included for illustrative purposes, and other embodiments may be performed in other manners without some or all such details. For example, multiple types of sensors may be used to provide multiple types of data and the multiple data types may be combined and used in various ways in various embodiments, including non-exclusive examples of magnetic sensors and/or IMUs (inertial measurement units) to measure position data and whether in addition to or instead of the use of GPS and inclinometer data as discussed with respect to FIGS. 2A-2C.

Figure 3:
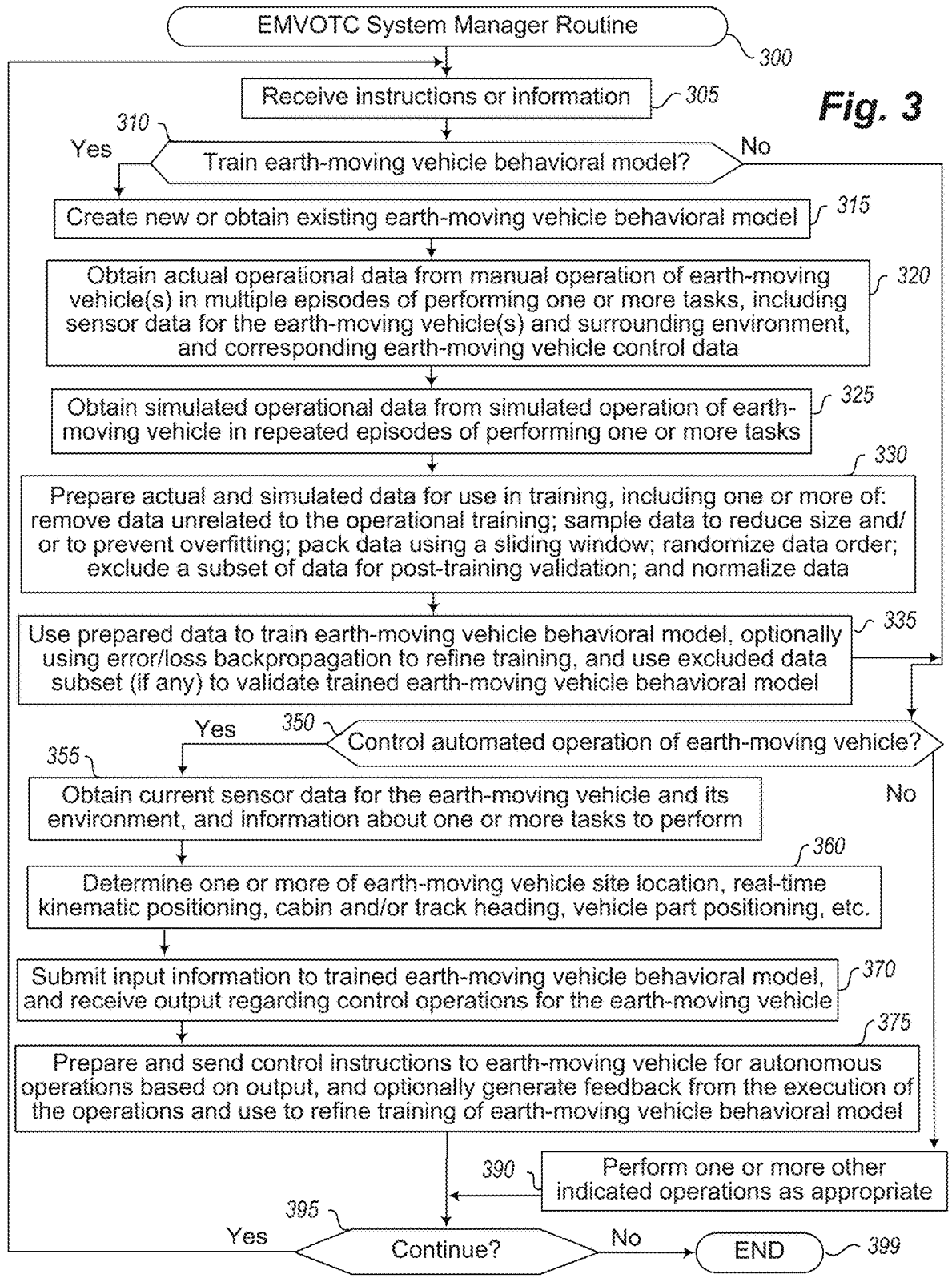
FIG. 3 is an example flow diagram of an illustrated embodiment of an Earth-Moving Vehicle Operation Training and Control (EMVOTC) System routine.

FIG. 3 is an example flow diagram of an illustrated embodiment of an EMVOTC (Earth-Moving Vehicle Operation Training and Control) System routine 300. The routine may be provided by, for example, execution of an embodiment of the EMVOTC system 140 of FIGS. 1A-1B and/or the EMVOTC system discussed with respect to FIGS. 2A-2Q and elsewhere herein, such as to perform automated operations for implementing autonomous control of earth-moving vehicles of one or more types, including to automatically determine and control movement of an earth-moving vehicle's arm(s) and attachment (e.g., digging bucket) to move materials or perform other actions, including in some embodiments by an EMVOTC system attached to (e.g., mounted on) and executing on an earth-moving vehicle (being controlled (e.g., without interacting with any other computing devices or systems remote from the vehicle, other than to receive transmissions such as GPS signals and RTK correction data). While routine 300 is discussed with respect to controlling operations of a single earth-moving vehicle at a time, it will be appreciated that the routine 300 may be performed in other manners in other embodiments, including to control operations of multiple earth-moving vehicles of one or more types on a job site, to be implemented by one or more configured devices or systems (optionally in multiple locations and/or operating in a distributed or otherwise coordinated manner, such as with a computing device local to an earth-moving vehicle performing some of the automated operations while one or more remote server systems in communication with that computing device perform additional portions of the routine), etc.

The routine 300 begins in block 305, where instructions or information is received (e.g., waiting at block 305 until such instructions or information is received). The routine continues to block 310 to determine whether to perform automated operations to train an earth-moving vehicle behavioral model for an earth-moving vehicle (e.g., based on receiving an instruction to do so, based on receiving training data to use in doing so, etc.), and if so continues to perform blocks 315-330 to implement corresponding activities (e.g., by an operational data determiner component 141, not shown), including in step 315 to create a new earth-moving vehicle behavioral model to be trained or obtain an existing earth-moving vehicle behavioral model (e.g., already at least partially trained). In block 320, the routine then obtains actual operational data from manual operation of one or more earth-moving vehicles in multiple episodes of performing one or more tasks (e.g., including actual sensor data for the earth-moving vehicle and its environment, corresponding actual manual control data for the earth-moving vehicle, etc.), and in block 325 similarly obtains simulated operational data from simulated operation of one or more earth-moving vehicles in multiple episodes of performing the one or more tasks (e.g., such as from an operational data simulator component 147, and optionally including simulated sensor data for the earth-moving vehicle and its environment, corresponding simulated control data for the earth-moving vehicle, etc.). It will be appreciated that the actual and simulated operational data may be previously generated and stored and/or may be concurrently generated, and that the routine may perform other operations in an asynchronous manner while waiting for data to be generated. After block 325, the routine continues to block 330 to prepare the obtained actual and simulated operational data for use in training activities, including to perform one or more of the following actions: remove data unrelated to actual operational training activities; sample data to reduce the size and/or to prevent overfitting; pack data using a sliding window technique; randomize the order of data for different episodes (e.g., to intermix actual and simulated data); normalize the data; etc. As one non-exclusive example, normalizing of the data may use the formula $(a-u)/(s+1\ e-8)$, where a represents a feature vector, u represents a mean of the feature vector, and s represents a standard deviation of the feature vector. After block 330, the routine continues to block 335, where it performs activities to use the prepared simulated and actual operational data to train the earth-moving vehicle behavioral model (e.g., by an operation trainer component 143, not shown), including to optionally use error/loss back propagation to refine the training of the model (e.g., to adjust weights of a neural network used to implement the model), and/or to use an excluded data set to validate the trained model. After block 335, or if it was instead determined in block 310 that the instructions or information received in block 305 are not to train an earth-moving vehicle behavioral model, the routine continues to block 350, where it determines whether the instructions or information received in block 305 are to use a trained earth-moving vehicle behavioral model to control autonomous operations of one or more corresponding earth-moving vehicles to perform one or more tasks. If so, the routine continues to perform blocks 355-375 (e.g., by an operation controller component 145, not shown), including to obtain in block 355 current status information for the earth-moving vehicle(s) (e.g., sensor data for the earth-moving vehicle(s) and the surrounding environment) and information about the one or more tasks to perform (e.g., as received in block 305). After block 355, the routine continues to block 360, where it determines information about the earth-moving vehicle (e.g., one or more of earth-moving vehicle location on the site, real-time kinematic positioning, cabin and/or track heading, positioning of parts of the earth-moving vehicle such as the arm(s) and attachment(s), etc.). In block 370, the routine then submits input information to a trained earth-moving vehicle behavioral model, and receives output from it corresponding to operations to be performed by the earth-moving vehicle(s) to perform the one or more tasks. In block 375, the routine then prepares and sends corresponding control instructions to the one or more earth-moving vehicles to initiate autonomous operations for performing the task(s) based on the output, and optionally generates feedback from the execution of the operations for use in subsequent refinement of the earth-moving vehicle behavioral model's training.

If it is instead determined in block 350 that the information or instructions received in block 305 are not to control automated operation of the earth-moving vehicle(s), the routine continues instead to block 390 to perform one or more other indicated operations as appropriate. For example, the operations performed with respect to block 390 may include receiving and storing data and other information for subsequent use (e.g., actual and/or simulated operational data; sensor data; an overview workplan and/or other goals to be accomplished, such as for the entire project, for a day or other period of time, and optionally including one or more tasks to be performed; etc.), receiving and storing information about earth-moving vehicles on the job site (which vehicles are present and operational, status information for the vehicles, etc.), receiving and responding to requests for information available to the EMVOTC system (e.g., for use in a displayed GUI to an operator user that is assisting in activities at the job site and/or to an end user who is monitoring activities), receiving and storing instructions or other information provided by one or more users and optionally initiating corresponding activities, etc. While not illustrated here, in some embodiments the routine may perform further interactions with a client or other end user, such as before, during or after receiving or providing information in block 390, as discussed in greater detail elsewhere herein.

After blocks 375 or 390, the routine continues to block 395 to determine whether to continue, such as until an explicit indication to terminate is received, or instead only if an explicit indication to continue is received. If it is determined to continue, the routine returns to block 305, and otherwise continues to block 399 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
receiving, by one or more computing systems, actual operational data that represents actual movements of one or more earth-moving vehicles of an indicated type during a plurality of first episodes each involving actual performance of one or more tasks under control of one or more human operators, wherein the one or more tasks each include moving one or more objects in an environment surrounding one of the one or more earth-moving vehicles from one or more current locations to one or more target destination locations;
receiving, by the one or more computing systems and from a simulator system, simulated operational data that represents simulated movements of at least one earth-moving vehicle of the indicated type during a plurality of second episodes each involving simulated performance of the one or more tasks;
preparing, by the one or more computing systems, the actual and simulated operational data for use in training a multi-layered actor model implemented with a multi-layer neural network using reinforcement learning, including:
generating, by the one or more computing systems, sampled operational data by sampling the actual operational data using a first frequency and by sampling the simulated operational data using a second frequency;
generating, by the one or more computing systems, reduced operational data by removing a subset of the sampled operational data that is generated during one or more time periods while an earth-moving vehicle is not performing movements corresponding to performance of the one or more tasks;
generating, by the one or more computing systems, normalized operational data by normalizing values in the reduced operational data according to one or more defined metrics;
generating, by the one or more computing systems, randomized operational data by changing, in the normalized operational data, ordering of data corresponding to at least some first and second episodes;
generating, by the one or more computing systems, a training data subset and a validation data subset from the randomized operational data, including selecting separate portions of the randomized operational data for use as the training and validation data subsets; and
generating, by the one or more computing systems, packed training data and packed validation data, wherein the packing includes using a sliding window of a defined quantity of multiple episodes to repeatedly combine and encode information about a group of multiple episodes of the defined quantity;
training, by the one or more computing systems, the multi-layered actor model, including supplying input data encoded in the packed training data to the multi-layer neural network and using differences between expected output data encoded in the packed training data and actual output of the multi-layer neural network from the supplied input data to improve performance of the trained multi-layered actor model, including back-propagating calculated loss through the multi-layer neural network to update weights of the multi-layer neural network;
validating, by the one or more computing systems, performance of the trained multi-layered actor model, including supplying further input data encoded in the packed validation data to the trained multi-layer neural network, and determining that further differences between further expected output data encoded in the packed validation data and further actual output of the multi-layer neural network from the supplied further input data are below one or more validation thresholds; and
providing, by the one or more computing systems and after the validating, the trained multi-layered actor model for use in controlling further actual movements of an actual earth-moving vehicle of the indicated type during autonomous operations to perform one or more further tasks without input by any human operators.

2. The computer-implemented method of claim 1 wherein the providing of the trained multi-layered actor model further includes:
determining, by the one or more computing systems, one or more of the further actual movements of the actual earth-moving vehicle based at least in part on submitting initial condition information to the trained multi-layered actor model corresponding to at least one further task; and
initiating, by the one or more computing systems, fully autonomous operations of the actual earth-moving vehicle to perform the one or more further actual movements of the earth-moving vehicle.

3. The computer-implemented method of claim 1 wherein each group of multiple episodes in the packed training data and packed validation data includes information about time elements associated with the multiple episodes of the group, and wherein the multi-layer neural network of the multi-layered actor model includes:
an input sequential neural network layer having one or more nodes to receive as input at least one of packed training data or packed validation data and to extract the encoded time elements for each group of multiple episodes and to generate corresponding logits;
at least one first hidden neural network layer having one or more nodes to receive the logits of the input sequential neural network layer and to generate additional logits as outputs;
a concatenation layer having one or more nodes to receive and merge the additional logits of the at least one first hidden neural network layer with the logits of the input sequential neural network layer and to output corresponding merged log its;

at least one second hidden neural network layer having one or more nodes to receive the merged logits with the sequential layer logits and to output a generated combination of states and logits; and an output neural network layer having one or more nodes to receive the generated combination of states and logits and to generate information about one or more movements to be implemented by an earth-moving vehicle of the indicated type.

4. The computer-implemented method of claim 1 wherein the indicated type of earth-moving vehicle is an excavator vehicle, and wherein the actual movements and the simulated movements and the further actual movements include movements of one or more hydraulic arms and of at least one attachment tool.

5. The computer-implemented method of claim 1 further comprising generating the calculated loss based on the differences between the expected output data and the actual output using one or more mean squared distances between expected and actual vectors for movement of one or more of an arm of the earth-moving vehicle or a cabin of the earth-moving vehicle or an attachment tool of the earth-moving vehicle, and/or using one or more sizes of at least one of the expected or actual vectors, and/or using one or more non-movement states of the earth-moving vehicle.

6. The computer-implemented method of claim 1 wherein the receiving of the actual operational data includes receiving first actual operational data that represents first actual earth-moving vehicle movements during a first plurality of actual episodes each involving performance of one or more tasks under control of a first human operator, receiving second actual operational data that represents second actual earth-moving vehicle movements during a second plurality of actual episodes each involving performance of one or more tasks under control of a second human operator, and merging the first and second actual operational data to form the actual operational data that is prepared for use in training the multi-layered actor model.

7. The computer-implemented method of claim 1 further comprising receiving, by the one or more computing systems, terrain data from sampling an environment surrounding the one or more earth-moving vehicles, and including the terrain data as part of the actual operational data, and wherein the one or more objects include at least one of soil or one or more rocks.

8. The computer-implemented method of claim 1 wherein the one or more tasks further include removing one or more obstacles on one or more paths between the one or more current locations and the one or more target destination locations.

9. The computer-implemented method of claim 1 further comprising executing, by the one or more computing systems, software instructions of an earth-moving operation training and control system to cause at least one of the receiving of the actual operational data, or the receiving of the simulated operational data, or the preparing of the actual and simulated operational data, or the training of the multi-layered actor model, or the validating of the performance of the trained multi-layered actor model, or the providing of the trained multi-layered actor model, or generating of the simulated operational data.

10. The computer-implemented method of claim 1 wherein the actual operational data includes actual manipulations by the one or more human operators of controls of the one or more earth-moving vehicles and actual movements of the one or more earth-moving vehicles in response to the actual manipulations, and wherein the receiving of the simulated operational data further includes generating the simulated operational data, wherein the simulated operational data includes simulated manipulations by at least one virtual human operator of simulated controls of the at least one earth-moving vehicle and simulated movements of the at least one earth-moving vehicle in response to the simulated manipulations, and further includes, for at least some of the simulated episodes, added delay to represent delay of the at least one virtual human operator in performing the simulated manipulations of the simulated controls.

11. A system, comprising:

one or more hardware processors;

a plurality of first sensors mounted on an actual earth-moving vehicle to obtain vehicle data about the actual earth-moving vehicle, including a real-time kinematic (RTK)-enabled positioning unit using GPS data from one or more GPS antennas on a cabin of the actual earth-moving vehicle, and one or more inclinometers;

a plurality of second sensors to obtain environment data about an environment surrounding the actual earth-moving vehicle, including at least one of one or more LiDAR sensors, or one or more image capture devices; and one or more memories having software instructions that, when executed by at least one processor of the one or more hardware processors, cause the at least one processor to perform automated operations including at least:

obtaining actual operational data that represents actual movements of the actual earth-moving vehicle during a plurality of actual episodes each involving performance of one or more tasks under control of one or more human operators, wherein the actual operational data is based at least in part on actual manipulations of actual controls of the actual earth-moving vehicle by the one or more human operators and on actual readings from the first and second sensors that reflect the actual movements;

obtaining simulated operational data that represents simulated movements of a simulated earth-moving vehicle of a same type as the actual earth-moving vehicle during a plurality of simulated episodes each involving simulated performance of the one or more tasks, wherein the simulated operational data is based at least in part on simulated manipulations of simulated controls of the simulated earth-moving vehicle by at least one simulated human operator and on respective simulated movements as represented by simulated readings from simulated first and second sensors;

preparing the actual and simulated operational data for use in training a behavioral model that provides movements of earth-moving vehicles of the same type in response to manipulations of controls of those earth-moving vehicles, wherein the prepared actual and simulated operational data lacks actual operational data generated while the actual earth-moving vehicle is not performing movements corresponding to performance of the one or more tasks;

training the behavioral model using the prepared actual and simulated operational data to perform autonomous operations of one or more actual earth-moving vehicles of the same type, including supplying input data to the behavioral model from the prepared actual and simulated operational data and using differences between actual output of the behavioral model from the supplied input data and expected output data from the prepared actual and simulated operational data to improve performance of the trained behavioral model; and providing the trained behavioral model for use in controlling further actual movements of the one or more actual earth-moving vehicles of the same type to perform one or more further tasks during fully autonomous operations without input by any human operators.

12. The system of claim 11 wherein the automated operations further include generating the simulated operational data, including, for at least some of the simulated episodes, adding delay to represent at least one of time involved in the simulated human operator performing the simulated manipulations of the simulated controls, or of time corresponding to the simulated earth-moving vehicle responding to the simulated manipulations of the simulated controls.

13. The system of claim 11 wherein the automated operations further include initiating the fully autonomous operations of the one or more actual earth-moving vehicles of the same type to perform one or more additional tasks using the trained behavioral model.

14. The system of claim 11 further comprising at least one of the earth-moving vehicle, or the one or more actual earth-moving vehicles.

15. The system of claim 11 wherein the behavioral model includes a multi-layer neural network, the multi-layer neural network including:

an input sequential neural network layer having one or more nodes to receive, as input, information from the prepared actual and simulated operational data about the actual and simulated manipulations, and to generate corresponding logits;

at least one first hidden neural network layer having one or more nodes to receive the logits of the input sequential neural network layer and to generate additional logits as outputs;

a concatenation layer having one or more nodes to receive and merge the additional logits of the at least one first hidden neural network layer with the logits of the input sequential neural network layer and to output corresponding merged log its;

at least one second hidden neural network layer having one or more nodes to receive the merged logits with the sequential layer logits and to output a generated combination of states and logits; and an output neural network layer having one or more nodes to receive the generated combination of states and logits and to generate, as output, information about one or more movements to be implemented by an earth-moving vehicle of the same type.

16. The system of claim 11 wherein the actual earth-moving vehicle and the simulated earth-moving vehicle and the one or more actual earth-moving vehicles are excavator vehicles, and wherein the actual movements and the simulated movements and the further actual movements include movements of one or more hydraulic arms and of at least one attachment tool.

17. A computer-implemented method comprising:

receiving, by one or more computing systems, actual operational data that represents actual movements of an actual earth-moving vehicle of an indicated type during a plurality of actual episodes each involving performance of one or more tasks under control of a human operator, wherein the actual operational data is based in part on actual manipulations of actual controls of the actual earth-moving vehicle by the human operator;

receiving, by the one or more computing systems and from a simulator, simulated operational data that represents simulated movements of a simulated earth-moving vehicle of the indicated type during a plurality of simulated episodes each involving simulated performance of the one or more tasks, wherein the simulated operational data is based in part on simulated manipulations of simulated controls of the simulated earth-moving vehicle by a simulated human operator;

preparing, by the one or more computing systems, the actual and simulated operational data for use in training a multi-layer neural network, wherein the prepared actual and simulated operational data lacks actual operational data generated while the earth-moving vehicle is not performing movements corresponding to performance of the one or more tasks;

training, by the one or more computing systems, the multi-layer neural network, including supplying input data from the prepared actual and simulated operational data to the multi-layer neural network and using differences between actual output of the multi-layer neural network from the supplied input data and expected output data from the actual and simulated operational data to improve performance of the trained multi-layered neural network; and providing, by the one or more computing systems and after the training, the trained multi-layer neural network for use in controlling further actual movements of one or more actual earth-moving vehicles of the indicated type during autonomous operations to perform one or more further tasks without input by any human operators.

18. The computer-implemented method of claim 17 further comprising generating the simulated operational data, including adding delay for at least some of the simulated episodes to represent at least one of time corresponding to the simulated human operator performing the simulated manipulations of the simulated controls, or of time corresponding to the simulated earth-moving vehicle responding to the simulated manipulations of the simulated controls.

19. The computer-implemented method of claim 17 wherein the actual earth-moving vehicle and the simulated earth-moving vehicle and the one or more actual earth-moving vehicles are excavator vehicles, wherein the actual movements and the simulated movements and the further actual movements include movements of one or more hydraulic arms and of at least one attachment tool, and wherein the method further comprises initiating the autonomous operations of the one or more actual earth-moving vehicles to perform one or more additional tasks using the trained multi-layered neural network.

20. The computer-implemented method of claim 17 wherein the multi-layer neural network includes:

an input sequential neural network layer having one or more nodes to receive, as input, information from the prepared actual and simulated operational data about the actual and simulated manipulations, and to generate corresponding logits;

at least one first hidden neural network layer having one or more nodes to receive the logits of the input sequential neural network layer and to generate additional logits as outputs;

a concatenation layer having one or more nodes to receive and merge the additional logits of the at least one first hidden neural network layer with the logits of the input sequential neural network layer and to output corresponding merged log its;

at least one second hidden neural network layer having one or more nodes to receive the merged logits with the sequential layer logits and to output a generated combination of states and logits; and an output neural network layer having one or more nodes to receive the generated combination of states and logits and to generate, as output, information about one or more movements to be implemented by an earth-moving vehicle of the indicated type.

* * * * *

UNITED STATES PATENT AND TRADEMARK OFFICE
CERTIFICATE OF CORRECTION

PATENT NO. : 12,371,878 B2
APPLICATION NO. : 18/107892
DATED : July 29, 2025
INVENTOR(S) : Adam Sadilek et al.

It is certified that error appears in the above-identified patent and that said Letters Patent is hereby corrected as shown below:

In the Claims

Column 29, Line 3, Claim 3:
"sponding merged log its" should read --sponding merged logits--.

Column 31, Line 45, Claim 15:
"sponding merged log its" should read --sponding merged logits--.

Column 33, Line 3, Claim 20:
"sponding merged log its" should read --sponding merged logits--.

Signed and Sealed this
Twenty-sixth Day of August, 2025

Coke Morgan Stewart
*Acting Director of the United States Patent and Trademark Office*